(12) United States Patent
Caliendo et al.

(10) Patent No.: US 12,453,727 B2
(45) Date of Patent: Oct. 28, 2025

(54) MONTELUKAST SALTS AND PHARMACEUTICAL COMPOSITIONS CONTAINING THE SAME

(71) Applicant: GENETIC S.P.A., Castel San Giorgio (IT)

(72) Inventors: Giuseppe Caliendo, Marigliano (IT); Giuseppe Cirino, Naples (IT); Ferdinando Fiorino, Benevento (IT); Francesco Frecentese, Aversa (IT); Marcelo Nicolas Muscara', Campinas (BR); Elisa Perissutti, Venafro (IT); Antonio Petti, Battipaglia (IT); Fiorentina Roviezzo, Bonea (IT); Vincenzo Santagada, Naples (IT); Beatrice Severino, Mugnano di Napoli (IT)

(73) Assignee: GENETIC S.P.A., Castel San Giorgio SA (IT)

( * ) Notice: Subject to any disclaimer, the term of this patent is extended or adjusted under 35 U.S.C. 154(b) by 844 days.

(21) Appl. No.: 17/615,337

(22) PCT Filed: Jun. 5, 2020

(86) PCT No.: PCT/EP2020/065629
§ 371 (c)(1),
(2) Date: Nov. 30, 2021

(87) PCT Pub. No.: WO2020/245358
PCT Pub. Date: Dec. 10, 2020

(65) Prior Publication Data
US 2022/0218690 A1    Jul. 14, 2022

(30) Foreign Application Priority Data
Jun. 7, 2019  (IT) .................. 102019000008340

(51) Int. Cl.
| | | |
|---|---|---|
| *A61K 31/47* | (2006.01) | |
| *A61K 31/137* | (2006.01) | |
| *A61K 31/167* | (2006.01) | |
| *A61P 11/06* | (2006.01) | |
| *A61P 11/08* | (2006.01) | |

(52) U.S. Cl.
CPC ............ *A61K 31/47* (2013.01); *A61K 31/137* (2013.01); *A61K 31/167* (2013.01); *A61P 11/06* (2018.01); *A61P 11/08* (2018.01)

(58) Field of Classification Search
CPC .... A61K 31/47; A61K 31/137; A61K 31/167; A61K 45/06; A61P 11/06; A61P 11/08; C07D 215/18
See application file for complete search history.

(56) References Cited

U.S. PATENT DOCUMENTS

| | | | |
|---|---|---|---|
| 8,771,744 B2 * | 7/2014 | Ruecroft ................. | A61K 9/14 424/489 |
| 2005/0107612 A1 | 5/2005 | Reguri | |
| 2005/0234241 A1 | 10/2005 | Sundaram | |

FOREIGN PATENT DOCUMENTS

| | | | | |
|---|---|---|---|---|
| EP | 0480717 | 4/1992 | | |
| WO | WO2002080916 | 10/2002 | | |
| WO | WO2004108679 | 12/2004 | | |
| WO | WO2005074935 | 8/2005 | | |
| WO | WO 2009/052625 A1 * | 4/2009 | .......... | C07D 215/18 |
| WO | WO2009052625 | 4/2009 | | |
| WO | WO2012030308 | 3/2012 | | |
| WO | WO 2012/030308 A2 * | 8/2012 | .............. | A61K 9/72 |

OTHER PUBLICATIONS

Tashkin, D.P., Fabbri, L.M. Long-acting beta-agonists in the management of chronic obstructive pulmonary disease: current and future agents. Respir. Res., 2010, 11, 149. (Year: 2010).*
Bastin, et al., Organic Process Research & Development, 2000, 4, 427-435.
Handbook of Pharmaceutical Excipients, Sixth Edition, Edited by Rone, Raymond (., et al., Jul. 2009).
International Search Report for PCT/EP2020/065639 dated Jun. 22, 2020.

* cited by examiner

*Primary Examiner* — Joseph K McKane
*Assistant Examiner* — David M Shim
(74) *Attorney, Agent, or Firm* — HUESCHEN AND SAGE

(57) ABSTRACT

The present invention relates to salts of Montelukast with β2 adrenergic agonists, pharmaceutical compositions containing the same and the use thereof in the treatment of respiratory inflammatory pathologies, obstructive pathologies and allergen-induced airway dysfunctions. The invention further relates to the process for preparing said salts.

8 Claims, 18 Drawing Sheets

A)

B)

C)

MONTELUKAST SALTS AND PHARMACEUTICAL COMPOSITIONS CONTAINING THE SAME

The present invention relates to salts of Montelukast with β2 adrenergic agonists, pharmaceutical compositions containing the same and the use thereof in the treatment of respiratory inflammatory pathologies, obstructive pathologies and allergen-induced airway dysfunctions. The invention further relates to the process for preparing said salts.

BACKGROUND OF THE INVENTION

Montelukast sodium (Formula I) is a well known selective antagonist of $CysLT_1$. It is orally administered and proved to be effective in asthma treatment or in other leukotrienes dependent diseases like allergies and inflammation. It is traded in tablets containing an amount of sodium salt corresponding to 4, 5 or 10 mg of Montelukast acid.

FORMULA I

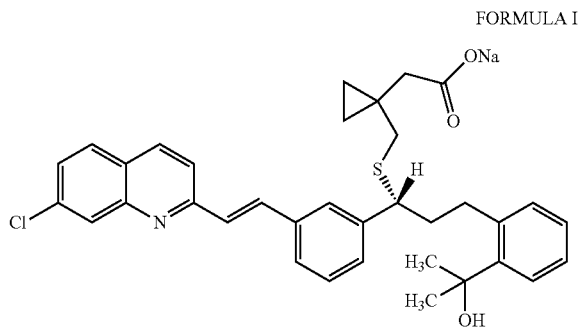

Montelukast sodium is a white hygroscopic powder, soluble in methanol, ethanol and water.

The sodium salt is obtained starting from Montelukast free carboxylic acid ((R,E)-2-(1-((1-(3-(2-(7-Chloroquinolin-2-yl)vinyl)phenyl)-3-(2-(2-hydroxypropan-2-yl)phenyl) propylthio)-methyl)cyclopropyl)acetic acid, Formula II) by treatment of a source of sodium ion.

FORMULA II

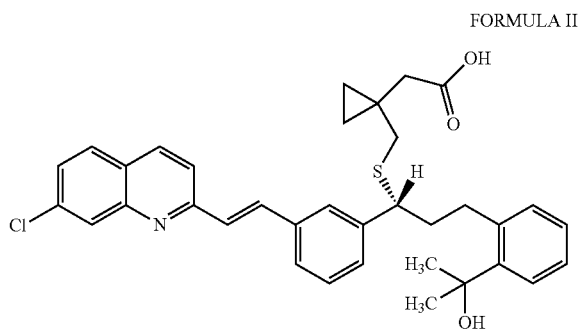 [SMILES: CC(C)(O)c1ccccc1CC[C@@H](SCC1(CC(=O)O)CC1)c1cccc(/C=C/c2ccc3ccc(Cl)cc3n2)c1]

Several patents have reported the procedures for the synthesis or the obtaining of Montelukast free acid: in particular WO2005/074935 describes a synthetic procedure of the key carboxylic intermediate, while WO 2004/108679, US 2005/0107612 and US 2005/0234241 describe the generation of an amine salt (dicyclohexyl amine or tertbutylamine) and the conversion into Montelukast sodium or free acid.

β2 (beta2) adrenergic receptor agonists are a class of drugs that act on the β2 adrenergic receptor. β2 adrenergic agonists cause smooth muscle dilation of bronchial passages, vasodilation in muscle and liver, relaxation of uterine muscle, and release of insulin. They are primarily used to treat asthma and other pulmonary disorders, such as COPD.

They can be divided into short-acting, long-acting, and ultra-long-acting β2 adrenoreceptor agonists.

Formoterol, (+/−)N-[2-hydroxy-5-[1-hydroxy-2[[2-(p-methoxyphenyl)-2-propyl]-amino]-ethyl]-phenyl]-formamide (Formula III) is a is a long-acting β2 agonist (LABA), used in the form of fumarate salt, for the treatment of respiratory inflammatory or obstructive pathologies due to its very potent and long lasting bronchodilator effect. It is characterized by two chiral centers. It is administered by inhalation as racemic mixture.

FORMULA III

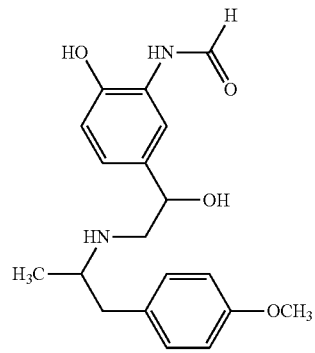

Definitions

Unless otherwise defined, all terms of art, notations and other scientific terminology used herein are intended to have the meanings commonly understood by those of skill in the art to which this disclosure pertains. In some cases, terms with commonly understood meanings are defined herein for clarity and/or for ready reference; thus, the inclusion of such definitions herein should not be construed to represent a substantial difference over what is generally understood in the art.

The term "physiologically acceptable excipient" herein refers to a substance devoid of any pharmacological effect of its own and which does not produce adverse reactions when administered to a mammal, preferably a human. Physiologically acceptable excipients are well known in the art and are disclosed, for instance in the Handbook of Pharmaceutical Excipients, sixth edition 2009, herein incorporated by reference.

The term "Montelukast" herein refers to Montelukast free carboxylic acid.

The terms "Short-acting β2 adrenergic receptor agonists" or "Short-acting β2 agonists" or "SABAs" herein refer to β2 adrenergic receptor agonists having a duration of action of approximately 4 to 6 hours. Preferred examples of SABAs that may be used in the present invention are Fenoterol, Orciprenaline, Salbutamol and Terbutaline.

The terms "Long-acting β2 adrenergic receptor agonists" or "Long-acting β2 agonists" or "LABAs" herein refer to β2 adrenergic receptor agonists having a duration of action up to 12 hours. Preferred examples of LABAs that may be used in the present invention are Bambuterol, Clenbuterol, Formoterol and Salmeterol.

The terms "Ultra-long-acting β2 adrenergic receptor agonists" or "Ultra-long-acting β2 agonists" or "Ultra-LABAs" herein refer to β2 adrenergic receptor agonists having a duration of 24 hours, allowing for once-daily dosing. Preferred examples of Ultra-LABAs that may be used in the present invention are Vilanterol, Indacaterol and Olodaterol.

The terms "Formoterol", "Fenoterol", "Salmeterol" and "Vilanterol" herein refer to Formoterol, Fenoterol, Salmeterol and Vilanterol free bases.

The terms "approximately" and "about" herein refer to the range of the experimental error, which may occur in a measurement.

The terms "comprising", "having", "including" and "containing" are to be construed open-ended terms (i.e. meaning "including, but not limited to") and are to be considered as providing support also for terms as "consist essentially of", "consisting essentially of", "consist of" or "consisting of".

The terms "consist essentially of", "consisting essentially of" are to be construed as semi-closed terms, meaning that no other ingredients which materially affects the basic and novel characteristics of the invention are included (optional excipients may thus included).

The terms "consists of", "consisting of" are to be construed as closed terms.

SUMMARY OF THE INVENTION

Recently, a wide number of medicines approved for the treatment of inflammatory airway diseases Is characterized by the combination of molecules such as Beclometasone/Formoterol, Fluticasone furoate/Vilanterol, Budesonide/Formoterol, Indacaterol/Glycopyrronium with different mechanism of action, aiming to a synergistic therapeutic effect.

The aim of the present invention is to provide novel Montelukast salts having a synergistic therapeutic effect. According to a first aspect, the present invention relates to the salts of Montelukast with β2 adrenergic agonists.

The present Inventors have surprisingly found that the salts of the present invention show a synergic effect in the control of allergen-induced airway dysfunctions.

A second aspect of the present invention is a process for the preparation of the Montelukast salts.

A third aspect of the present invention are pharmaceutical compositions comprising the Montelukast salts in combination with at least one physiologically acceptable excipient.

A fourth aspect of the present invention are the above Montelukast salts and pharmaceutical compositions for use as medicaments.

A fifth aspect of the present invention are the above Montelukast salts and pharmaceutical compositions for use in treating respiratory inflammatory pathologies, obstructive pathologies, allergen-induced airway dysfunctions.

DESCRIPTION OF THE FIGURES

FIG. 6 shows the $^{13}$C-NMR HMBC (175 MHz; DMSO-$d_6$) spectrum of Montelukast formoterol salt.

FIG. 18 represents (A) Plasma IgE levels: vehicle vs OVA $p<0.01$; (B) IL-4 pulmonary dosage: vehicle vs OVA $p<0.01$, Formoterol (0.3 mg/Kg), Montelukast (0.3 mg/Kg) and Montelukast Formoterol salt (0.75 mg/Kg) vs OVA $p<0.05$; (C) IL-13 pulmonary dosage: vehicle vs OVA $p<0.01$, Formoterol (0.3 mg/Kg), Montelukast (0.3 mg/Kg) and Montelukast Formoterol salt (0.75 mg/Kg) vs OVA $p<0.05$.

DETAILED DESCRIPTION OF THE INVENTION

The present invention relates to a salt of Montelukast with a β2 adrenergic agonist.

In a preferred embodiment of the invention, the β2 adrenergic agonist is selected from short-acting β2 agonists, long-acting β2 agonists or ultra-long-acting β2 agonists.

In another preferred embodiment of the invention, the β2 adrenergic agonist is selected from the group comprising Fenoterol, Orciprenaline, Salbutamol, Terbutaline, Bambuterol, Clenbuterol, Formoterol, Salmeterol, Vilanterol, indacaterol and Olodaterol.

More preferably, the β2 adrenergic agonists are Formoterol, Fenoterol, Salmeterol and Vilanterol.

In particular, Montelukast formoterol salt of Formula IV represents a pharmaceutically acceptable salt able to enhance the therapeutic potential.

FORMULA IV

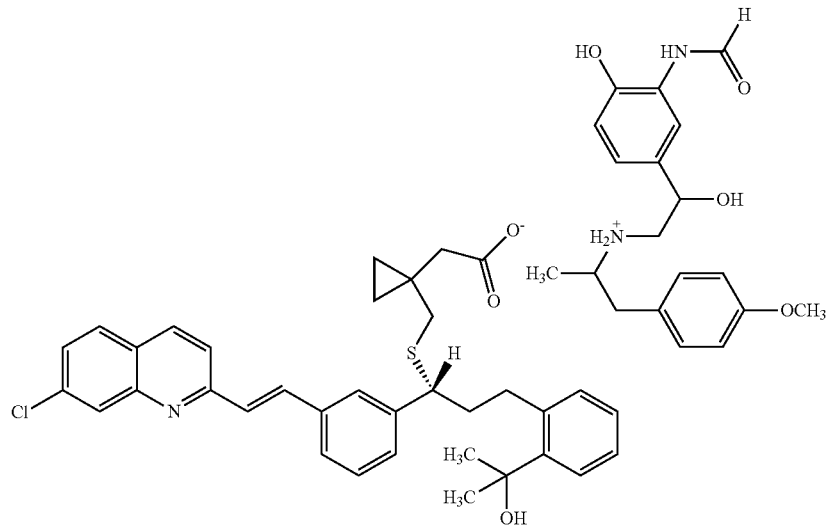

It allows the fast onset and long lasting action of Formoterol with the decreasing number of times to use the rescue inhaler provided by Montelukast. It can be administered by inhalation and this is another difference with Montelukast sodium. Montelukast formoterol salt is less hydrophilic if compared to Montelukast sodium and has therefore a good potential to pass the cell membranes via an inhalation route due to the lipophylic nature of the two components.

In an embodiment according to the invention, the Montelukast Formoterol salt in crystalline form I is characterized by a X-ray powder diffraction spectrum, which is obtained by using CuKα radiation and represented by °2θ angle, in which there are characteristic peaks at about 6.39, 9.97, 13.05, 13.77, 15.42, 16.87, 17.87, 18.25, 20.31, 20.77, 23.14, 24.57, 26.23, 28.01, 28.96, 32.09, 33.81 and 38.57.

Figure 1:
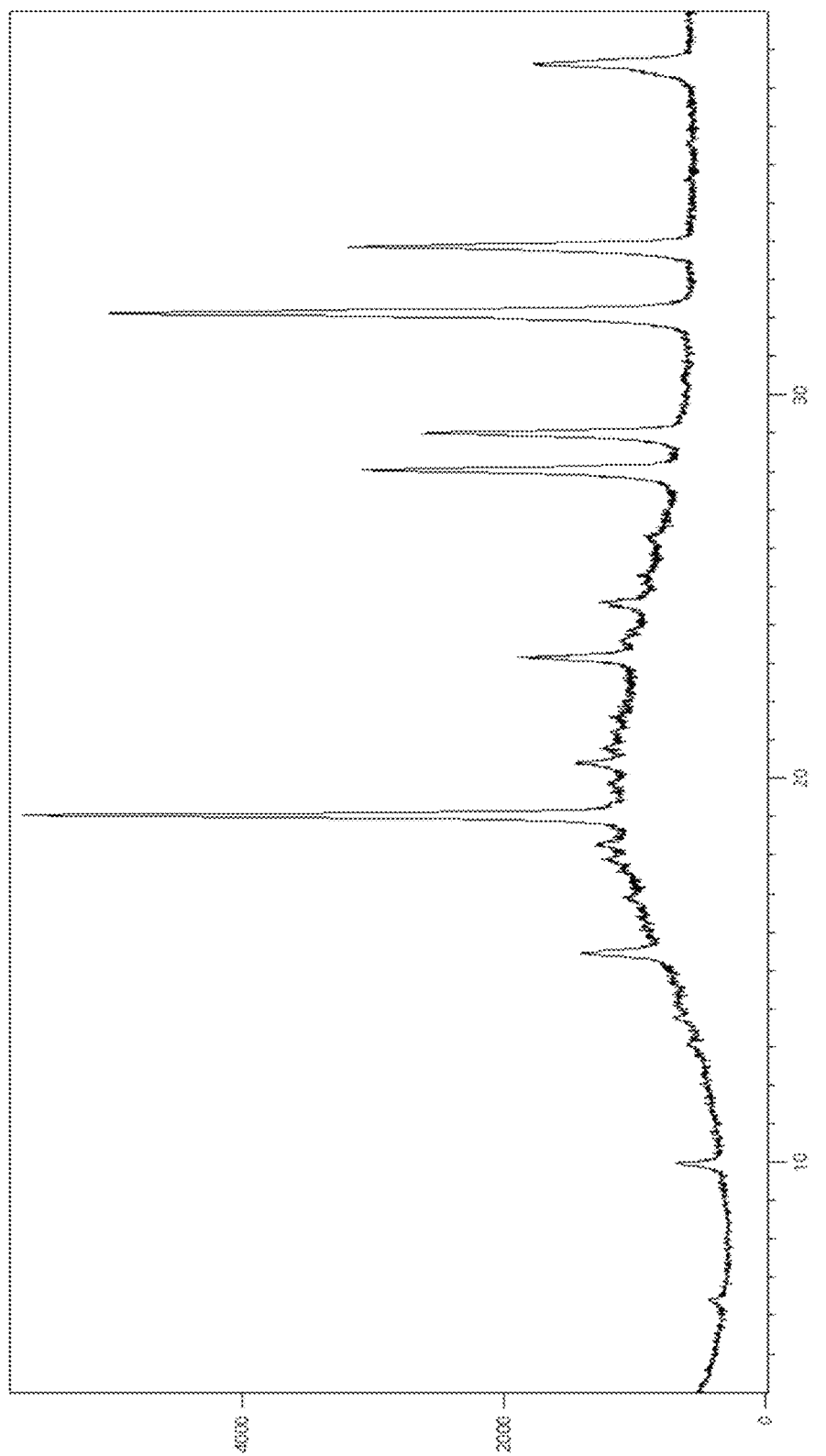
FIG. 1 shows the X-Ray Powder Diffraction spectrum of Montelukast formoterol salt obtained from ethyl acetate.

In another embodiment according to the invention, the Montelukast salt in crystalline form I is characterized by a X-ray powder diffraction spectrum as represented in FIG. 1.

Other pharmaceutically acceptable derivatives are Montelukast Fenoterol (Formula V), Salmeterol (Formula VI) and Vilanterol salts (Formula VII).

FORMULA V

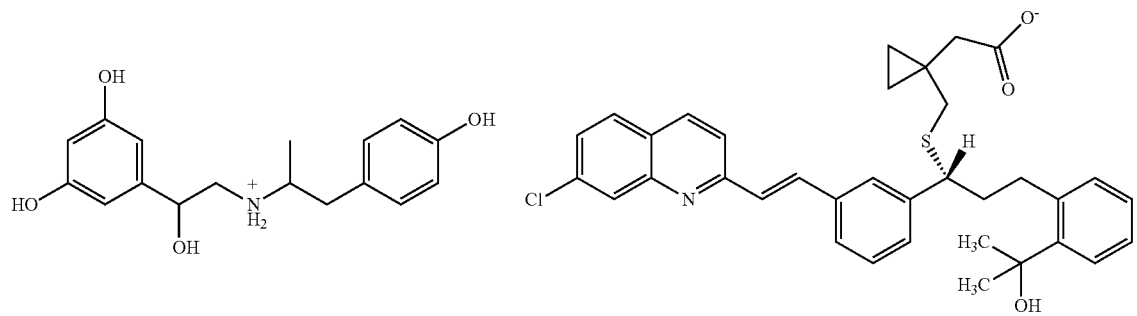

FORMULA VI

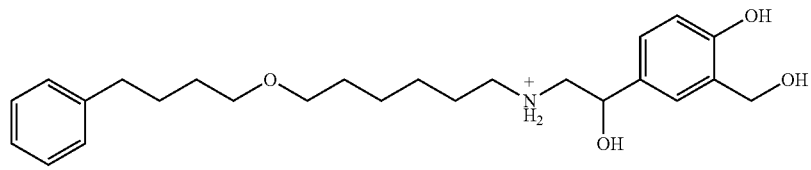

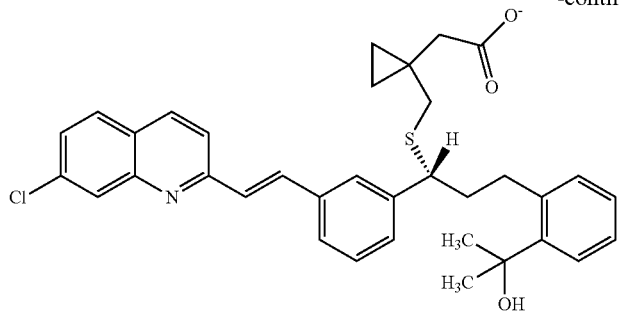

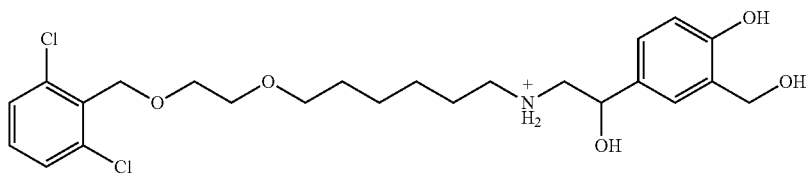

FORMULA VII

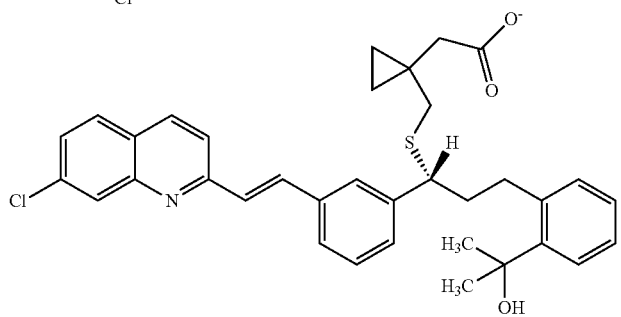

As will be shown in the experimental section, Montelukast Formoterol, Fenoterol, Salmeterol and Vilanterol salts have been evaluated performing pre-clinical studies.

In vitro and in vivo (paw mouse edema and a mouse model of asthma) experiments highlighted the therapeutic advantages of these associations.

In particular, therapeutic efficiency of the Montelukast Formoterol salt proved to be significantly higher than Formoterol and Montelukast administered at double molar dose.

The data obtained demonstrate a synergic effect of the combination of Formoterol and Montelukast, in particular, both in the control of the bronchial tone and in the modulation of the inflammatory response.

The data obtained evidence a marked reduction of the phenomenon of $\beta_2$ receptor desensitization, determining an increased efficacy in the control of allergen-induced airway dysfunction and an increased anti-inflammatory activity.

Another aspect of this invention relates to a pharmaceutical composition comprising as active ingredient a Montelukast salt with a $\beta_2$ adrenergic agonist in combination with at least one physiologically acceptable excipient.

Preferably, said compositions are in the form of powder, suspension or solution, more preferably said compositions are administered by inhalation or oral route.

The compositions may be used for inhalation through mucosa or consists in a solution for aerosol therapy. For the administration by inhalation, the compound of the invention may be delivered in the form of an aerosol spray in pressurized packs or by use of nebulisers. Moreover the formulation may also be delivered as a powder inhaled through the insufflations of inhaler devices. The preferred delivery system for inhalation is a metered dose inhalation aerosol formulated as a suspension or solution of the ingredients in suitable propellants for inhalable pharmaceutical preparations.

The pharmaceutical compositions suitable for oral use can be administered in the form of tablets, capsules or syrups.

Another aspect of the invention relates to the Montelukast salts or their pharmaceutical compositions according to the invention for use as a medicament.

According to a preferred embodiment of the invention, the Montelukast salts or their pharmaceutical compositions are useful in treating respiratory inflammatory pathologies, obstructive pathologies, allergen-induced airway dysfunctions such as Asthma, COPD and pulmonary fibrosis.

Advantageously, the Montelukast salts of the invention significantly reduces allergen-induced airway dysfunction even if administered at halved dose respect to single drugs.

In particular, the pharmaceutical composition comprising the Montelukast Formoterol salt according to invention increases anti-inflammatory activity compared to Montelukast and Formoterol administered at double dose and reduces $\beta_2$ receptor desensitization.

Another aspect of the invention relates to a process for the preparation of the Montelukast salts according to the invention, comprising the steps of:

i) dissolving or suspending Montelukast in an organic solvent;

ii) adding a β2 adrenergic agonist, preferably Formoterol, Fenoterol, Salmeterol or Vilanterol, under stirring;

iii) isolating the salt of Montelukast with the β2 adrenergic agonist, preferably the Montelukast Formoterol. Fenoterol, Salmeterol or Vilanterol salt.

The useful solvents for salt formation include $C_1$-$C_4$ aliphatic alcohols (methanol, ethanol, isopropanol), $C_2$-$C_6$ aliphatic ketones (acetone, methyl ethyl ketone, methyl isopropyl ketone, diethyl ketone), $C_4$-$C_8$ aliphatic ethers (diethyl ether, diisopropyl ether, ditertbutyl ether), $C_4$-$C_6$ cyclic ethers (tetrahydrofuran, dioxane), $C_3$-$C_8$ aliphatic esters (ethyl acetate), $C_5$-$C_8$ hydrocarbons (toluene, xylene, pentane, hexane, heptane), $C_1$-$C_4$ chlorinated hydrocarbons (dichloromethane, chloroform, dichloroethane), aliphatic $C_2$-$C_4$ nitriles (acetonitrile) or mixtures thereof.

The preferred solvent for salt formation is ethyl acetate.

Preferably, in the process according to the invention the mmol/mL ratio between Montelukast and the organic solvent is from 1:1 to 1:5.

Preferably, in the process according to the invention the molar ratio between Montelukast and the β2 adrenergic agonist, preferably Formoterol, Fenoterol, Salmeterol or Vilanterol, is from 1:1 to 1:1.5.

According to a preferred embodiment of the process of the invention, the isolation step iii) is carried out by adding an anti-solvent selected from $C_5$-$C_8$ aliphatic straight chain hydrocarbons, preferably pentane, hexane, heptane or a mixture thereof.

Preferably, the volume ratio of the organic solvent to the anti-solvent is from 2:1 to 1:2, preferably 1:1 volume ratio.

In alternative, the isolation step iii) is carried out by crystallization.

The useful solvents for crystallization are the same reported above for salt formation, preferably diethyl ether.

Preferably, the crystallization is carried out by seeding.

In an embodiment according to the invention, the process further comprises a drying step at a temperature ranging from 30 to 80° C., preferably 40-50° C.

Preferably, the drying step is performed in oven.

Materials and Methods a) Chemistry

Montelukast, Formoterol, Fenoterol and Salmeterol were purchased from Carbosynth Ltd (Compton Berkshire, UK). Vilanterol was purchased from Accel Pharmtech (East Brunswick, US). All the other commercial products have been purchased from Merck-Sigma Aldrich, $^1$H (700 MHz) and $^{13}$C (175 MHz) NMR spectra were recorded on a Agilent INOVA spectrometer; chemical shifts were referenced to the residual solvent signal (DMSO-d6: $\delta_H$=2.49, $\delta_C$=39.0); two and three bond $^1$H-$^{13}$C connectivities were determined by gradient 2D HMBC experiments optimized for a $^{2,3}$J of 8 Hz. X-ray powder diffraction (XRPD) was performed using a Panalytical X'pert PRO diffractometer. Intensity profiles were collected in the 2θ range of 4-40° using Ni-filtered CuKα radiation (λ=1.5406 Å) at 40 kV and 30 mA, with a step size 0.02°, at a scanning time of 120 s/step. The diffraction patterns were processed using the Highscore Plus suite.

b) Pre-Clinical Pharmacological Assays

IN VITRO STUDY. Female BALB/c mice (8 weeks; Chaules River) were sacrificed and bronchial tissues were rapidly dissected and cleaned from fat and connective tissue. Rings of 1-2 mm length were cut and placed in organ bathe mounted to isometric force transducers (type 7006, Ugo Basile, Comerio, Italy) and connected to a Powerlab 800 (AD Instruments). Rings were initially stretched until a resting tension of 0.5 g was reached and allowed to equilibrate for at least 30 min. In each experiment bronchial rings were challenged with carbachol (10-6 mol/L) until the response was reproducible. Once a reproducible response was achieved bronchial reactivity was assessed performing a cumulative concentration-response curve to Formoterol in presence or absence of Montelukast (1 μM).

In Vivo Study

Paw mouse edema. CD1 male mice (Charles River; weight 25-30 g) were divided in groups (n=7) and lightly anaesthetized with enflurane. Each group of animals received sub planter administration of 50 μl of physiologic solution containing carrageenin (1%). Paw volume was measured using a hydroplethismometer specially modified for small volumes (Ugo Basile Milan Italy) immediately before the subplantar injection and 0.5, 1, 2, 3, 4 and 24, 48 and 72 h thereafter. The control group received intraplantar administration of the vehicle. The increase in paw volume was evaluated as difference between the paw volume at each time point and the basal paw volume.

In order to assess in vivo the synergistic effect of Montelukast formoterol salt, mice received 30 minutes before intraplantar injection of carrageenin intraperitoneal administration of vehicle, Formoterol (0.3 mg/Kg), Montelukast (0.3 mg/Kg) or Montelukast formoterol salt (0.3 mg/Kg).

Mouse model of asthma. Female BALB/c mice (8 weeks: Charles River) were sensitized through subcutaneous administration of Ovalbumin (100 μg dissolved in 400 μl of AlOH$_3$ 13.5 mg/ml) on days 0 and 8, on the twenty-first day the mice were stimulated by aerosolic administration of Ovalbumin (3% for twenty minutes). The mice were sacrificed after 48 hours and the bronchi used for the evaluation of bronchial reactivity at carbachol and salbutamol. The drugs were administered intraperitoneally prior to each exposure to the allergen. Montelukast and Formoterol were administered at a dose of 0.3 mg/kg, while doses of 0.3, 0.75 and 1.5 mg/kg were tested for the Montelukast formoterol salt. Doses have been chosen to ensure an equimolar comparison of drugs in terms of therapeutic efficacy. Pulmonary tissues were harvested and used for dosage of cytokines such as IL-4 and IL-13. In addition plasma levels of IgE were measured.

EXPERIMENTAL SECTION

Example 1

Synthesis of MONTELUKAST FORMOTEROL SALT (IV)

N-(2-(3-formamido-4-hydroxyphenyl)-2-hydroxyethyl)-1-(4-methoxy-phenyl)propan-2-aminium-2-(1-(((1-(3-(2-(7-chloroquinolin-2-yl)vinyl)-phenyl)-3-(2-(2-hydroxypropan-2-yl)phenyl)propyl)thio-)methyl)cyclopropyl)acetate Montelukast (360 mg, 0.58 mmol) was dissolved in 19 mL of ethyl acetate. Formoterol (200 mg, 0.58) was added to the solution at once under intense stirring. Stirring was prolonged for 1 hour and then n-hexane (19 mL) was slowly added with continuous stirring. The reaction mixture was further stirred for 15h. The solid thus obtained was filtered, washed with n-hexane (2×10 mL) and dried in oven (50° C., 12h). Yield 80%. M.p. 129.4±2.1 $^1$H NMR (700 MHz, DMSO-d$_6$, J in Hz) Formoterol: δ 0.96 (d, 6.2, 3H), 2.44 (overlapped, 1H), 2.77 (overlapped, 1H), 2.82 (overlapped, 1H), 3.03 (overlapped, 1H), 3.69 (s, 1H), 4.58 (m, 1H), 6.77 (overlapped, 2H), 6.83 (overlapped, 2H), 6.85 (overlapped, 2H), 7.06 (d, 8.5, 2H), 8.03 (s, 1H), 8.30 (s, 1H), 9.56 (bs, NH).

Montelukast: δ 0.35-0.43 (m, 4H), 1.39 (s, 6H), 2.11 (overlapped, 1H), 2.18 (overlapped, 1H), 2.30 (s, 2H), 2.49 (overlapped, 2H), 2.73 (overlapped, 1H), 3.03 (overlapped, 1H), 3.98 (t, 7.5, 1H), 6.90 (overlapped, 1H), 7.03 (overlapped, 1H), 7.11 (overlapped, 18), 7.35 (overlapped, 1H), 7.36 (overlapped, 1H), 7.38 (overlapped, 1H), 7.40 (overlapped, 1H), 7.49 (d, 16.3, 1H), 7.59 (dd, 2.0, 10.7, 1H), 7.62 (d, 7.5, 1H), 7.71 (s, 1H), 7.88 (d. 16.3, 1H), 7.93 (d, 8.7, 1H), 8.00 (d, 8.7, 1H), 8.40 (d, 8.7, 1H)

$^{13}$C-NMR Montelukast formoterol salt (175 MHz, DMSO-d$_6$): δ 172.7, 159.8, 157.6, 156.8, 148.0, 146.7, 145.8, 143.6, 139.6, 136.6, 136.1, 135.0, 134.2, 131.0, 129.8, 128.9, 128.3, 127.2, 126.8, 126.7, 126.4, 125.9, 125.7, 125.6, 125.3, 125.2, 121.6, 120.3, 118.5, 114.6, 113.6, 69.9, 54.9, 54.1, 53.0, 49.4, 42.6, 39.9, 38.9, 31.9, 31.6, 17.3, 12.1, 11.9.

Example 2

Montelukast (720 mg) and Formoterol (400 mg) were charged into a round bottom flask and added with acetonitrile (30 ml) and isopropanol (12 mL). The solution was stirred for 10 minutes and then heated to 80° C. for 1h. After cooling a solid was obtained by filtration. The powder was washed with acetonitrile. Re-crystallization from diethyl ether gave the desired compound. Yield 62%.

Example 3

Montelukast (360 mg, 0.58 mmol) was dissolved in 19 mL of acetone. Formoterol (200 mg, 0.58) was added to the solution at once under intense stirring. After 10 minutes a precipitate formed. Stirring was prolonged for 4 hours and then the solid was filtered. The solid obtained was washed with n-hexane (2×10 mL) and dried in oven (50° C., 12h). Yield 66%.

Example 4

Synthesis of MONTELUKAST FENOTEROL SALT (V)

N-(2-(3,5-dihydroxyphenyl)-2-hydroxyethyl)-1-(4-hydroxyphenyl)propan-2-aminium-2-(1-(((1-(3-(2-(7-chloroquinolin-2-yl)vinyl)phenyl)-3-(2-(2-hydroxypropan-2-yl)phenyl)propyl)thio)methyl)cyclopropyl)acetate Montelukast (300 mg, 0.51 mmol) was dissolved in 15 mL of ethyl acetate. Fenoterol (155 mg, 0.51 mmol) was added to the solution at once under intense stirring. Stirring was prolonged for 1 hour and then n-hexane (15 mL) was slowly added with continuous stirring. The reaction mixture was further stirred for 15h. The solid thus obtained was filtered, washed with n-hexane (2×10 mL) and dried in oven (50° C., 12h).

Example 5

Synthesis of MONTELUKAST SALMETEROL SALT (VI)

N-(2-hydroxy-2-(4-hydroxy-3-(hydroxymethyl)phenylethyl)-6-(4-phenylbutoxy)hexan-1-aminium-2-(1-(((1-(3-(7-chloroquinolin-2-yl)vinyl)phenyl)-3-(2-(2-hydroxypropan-2-yl)phenyl)propyl)thio)methyl)cyclopropyl)acetate Montelukast (300 mg, 0.51 mmol) was dissolved in 15 mL of ethyl acetate. Salmeterol (212 mg, 0.51 mmol) was added to the solution at once under intense stirring. Stirring was prolonged for 1 hour and then n-hexane (15 mL) was slowly added with continuous stirring. The reaction mixture was further stirred for 15h. The solid thus obtained was filtered, washed with n-hexane (2×10 mL) and dried in oven (50° C., 12h).

Example 6

Synthesis of MONTELUKAST VILANTEROL SALT (VII)

6-(2-((2,6-dichlorobenzyl)oxy)ethoxy)-N-(2-hydroxy-2-(4-hydroxy-3-(hydroxymethyl)-phenyl)ethyl)hexan-1-aminium-2-(1-(((1-(3-(2-(7-chloroquinolin-2-yl)vinyl)phenyl)-3-(2-2-hydroxypropan-2-yl)phenyl)propyl)thio)methyl)cyclopropyl)acetate Montelukast (300 mg, 0.51 mmol) was dissolved in 15 mL of ethyl acetate. Vilanterol (248 mg, 0.51 mmol) was added to the solution at once under intense stirring. Stirring was prolonged for 1 hour and then n-hexane (15 mL) was slowly added with continuous stirring. The reaction mixture was further stirred for 15h. The solid thus obtained was filtered, washed with n-hexane (2×10 mL) and dried in oven (50° C., 12h).

Results

Figure 2:
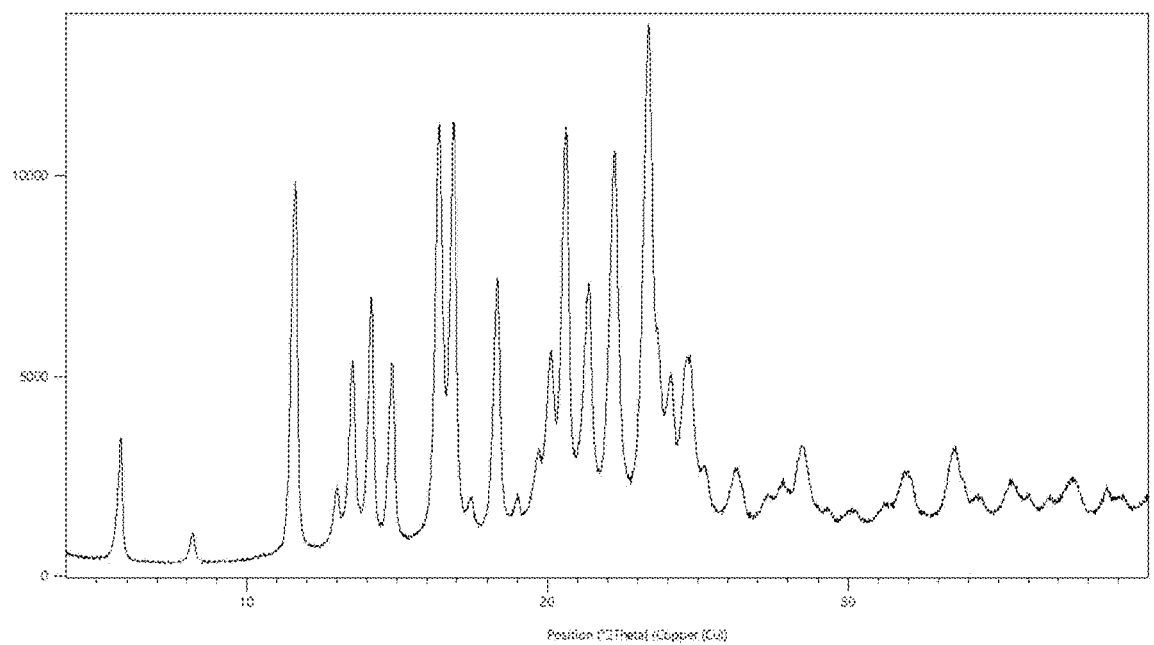
FIG. 2 shows the X-Ray Powder Diffraction spectra of the parent drugs: A) Formoterol; B) Montelukast.
Figure 2:
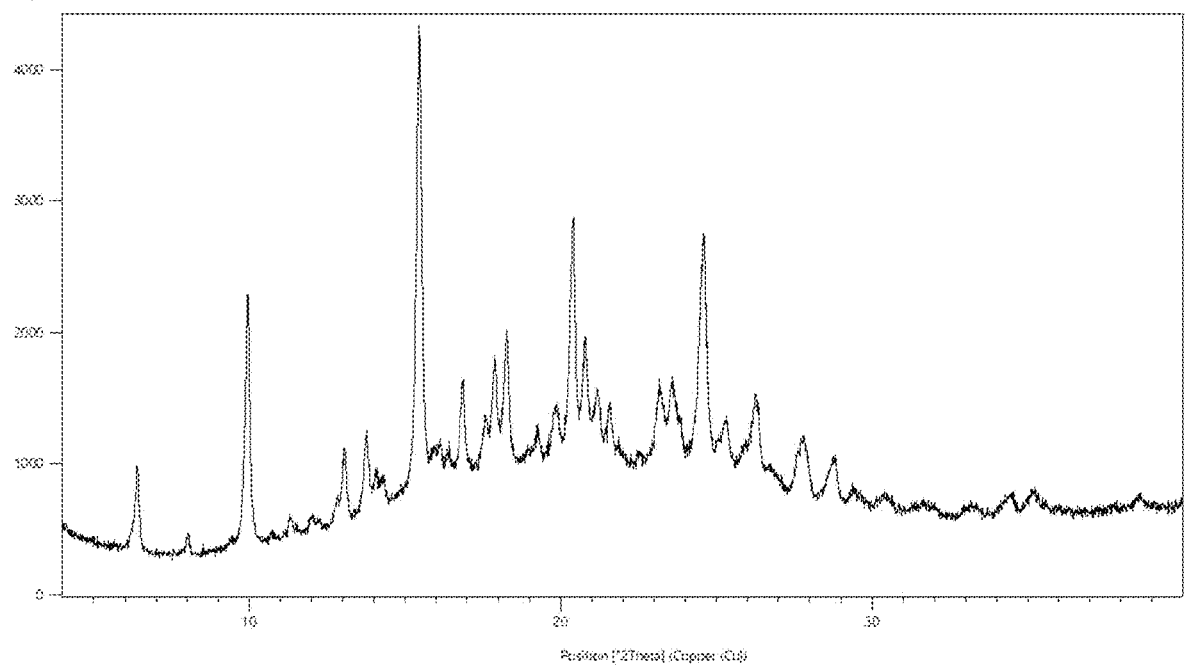
Figure 3:
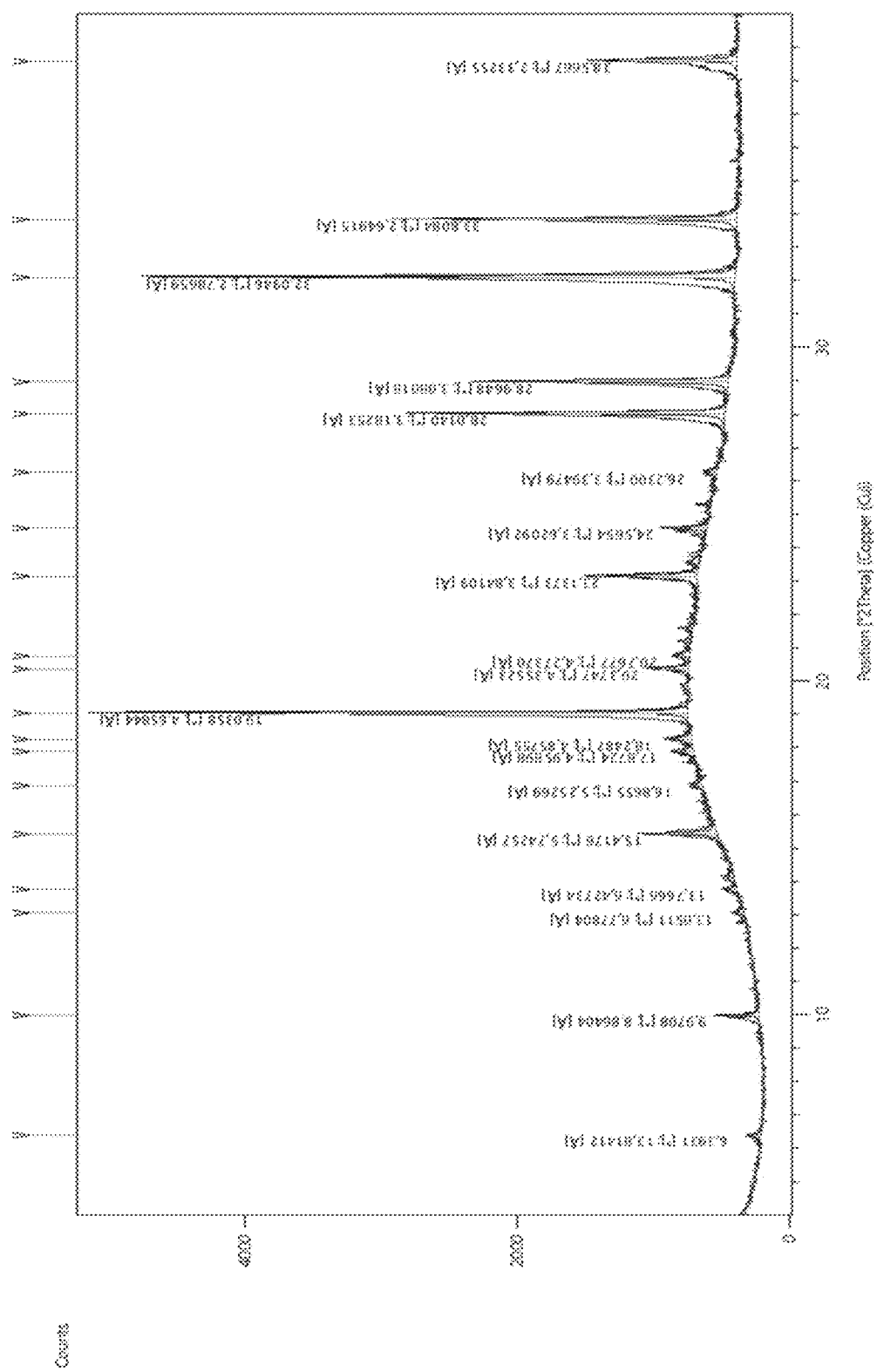
FIG. 3 shows the X-Ray Powder Diffraction spectrum of Montelukast formoterol salt, obtained from ethyl acetate, with relative peak positions (°2theta) and d-spacing (Angstrom).

The salt obtained from the procedure reported as Example 1 was selected for specific chemical characterization. The Montelukast formoterol salt was obtained as a pale brown powder and the XRPD pattern, showed in FIG. 1, evidenced a crystalline diffraction pattern different from those of the parent drugs (FIG. 2, A and B). FIG. 3 reports position [°2Theta] (Copper(Cu)) of the main peaks of crystalline form.

In order to ascertain the interaction between the two constituents, represented by an organic acid and a base, respectively, a mono and two-dimensional NMR analysis was performed. In particular, a preliminary detailed spectroscopic analysis of the indissociated form of the two constituents was carried out. Subsequently, the spectroscopic analysis of the salt was performed.

Figure 4:
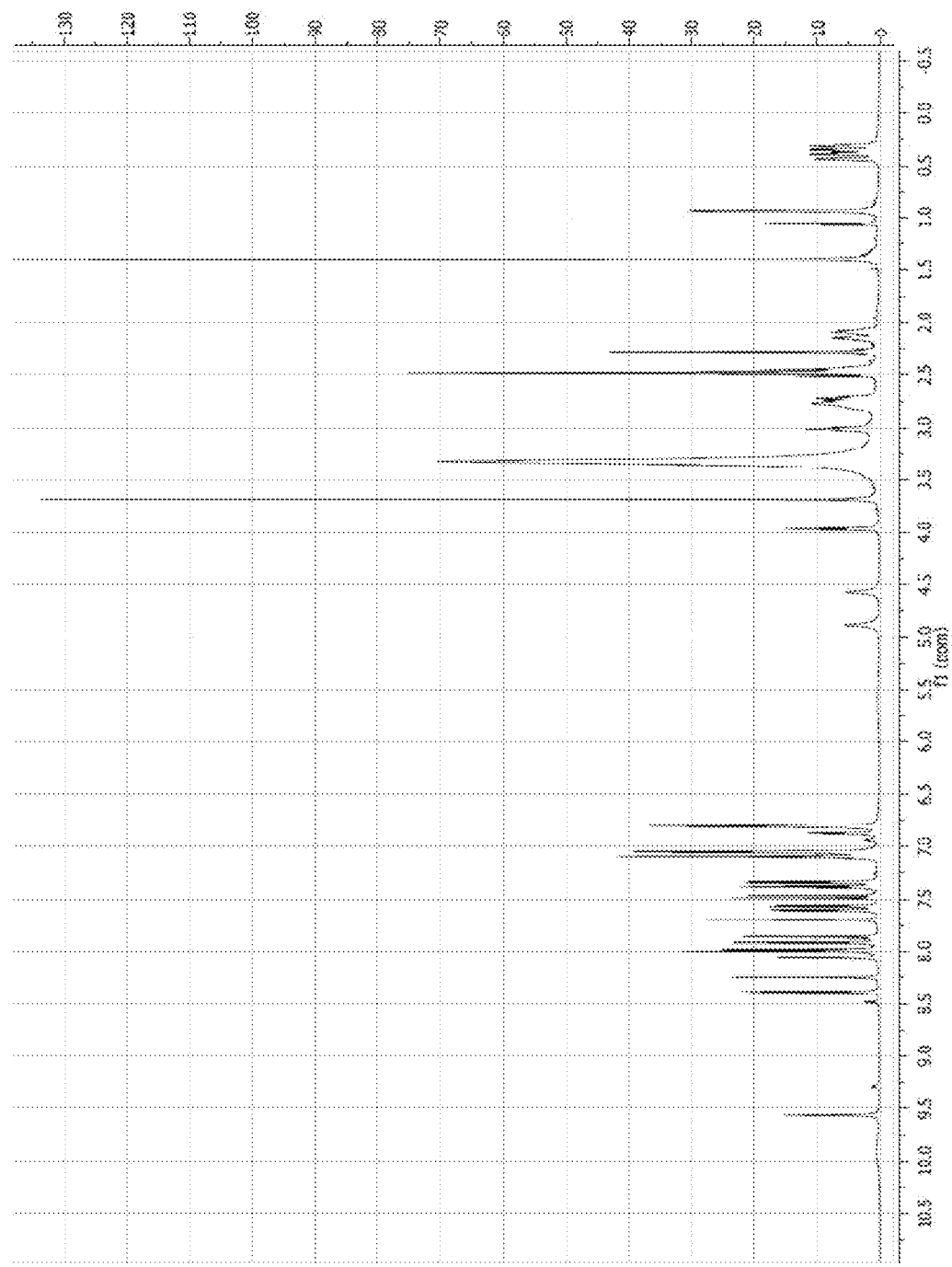
FIG. 4 shows the $^1$H-NMR (700 MHz; DMSO-$d_6$) spectrum of Montelukast formoterol salt obtained from ethyl acetate.

The $^1$H NMR spectrum of Montelukast formoterol salt (FIG. 4) showed differences in chemical shift values in comparison to Montelukast and Formoterol, previously analyzed.

Figure 5:
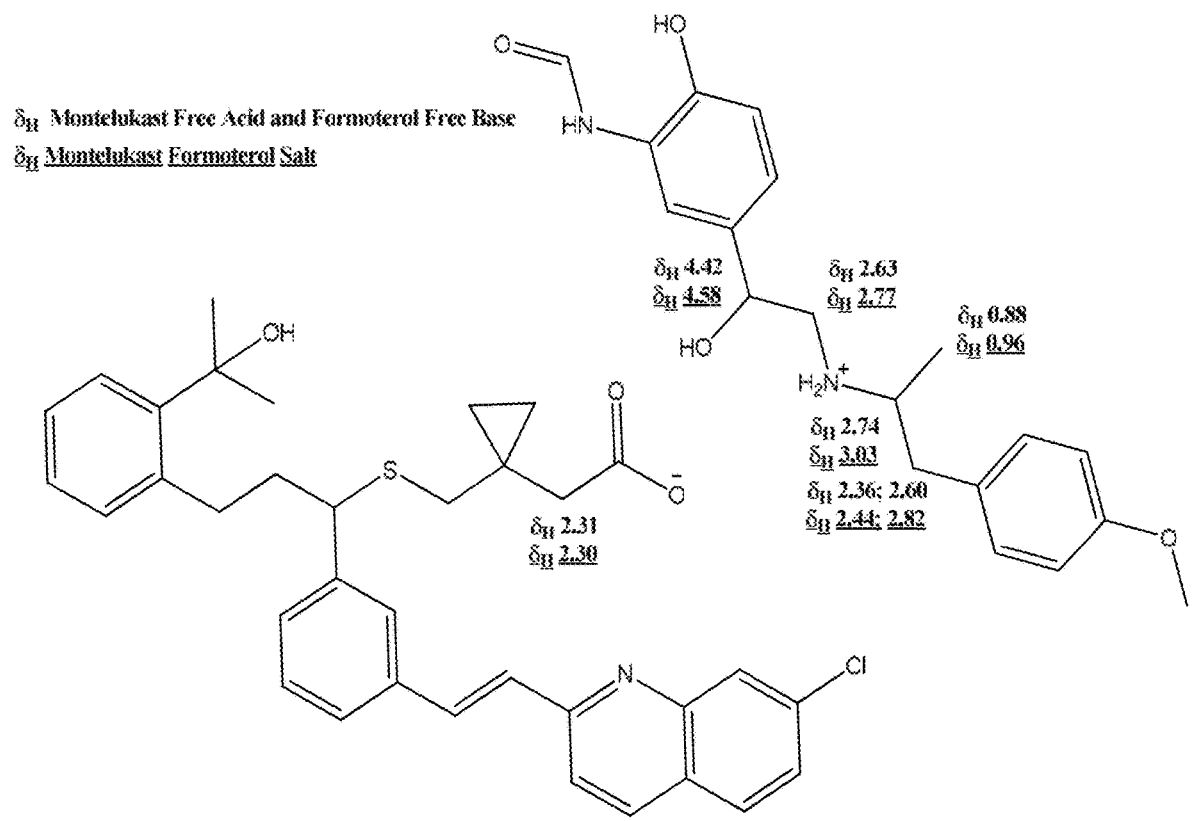

In particular, it was evidenced that signals related to protons bound to the carbon atoms in the chemical area near to Formoterol secondary amine presented a net variation in their chemical shifts, as reported in the following FIG. 5.

Figure 6:
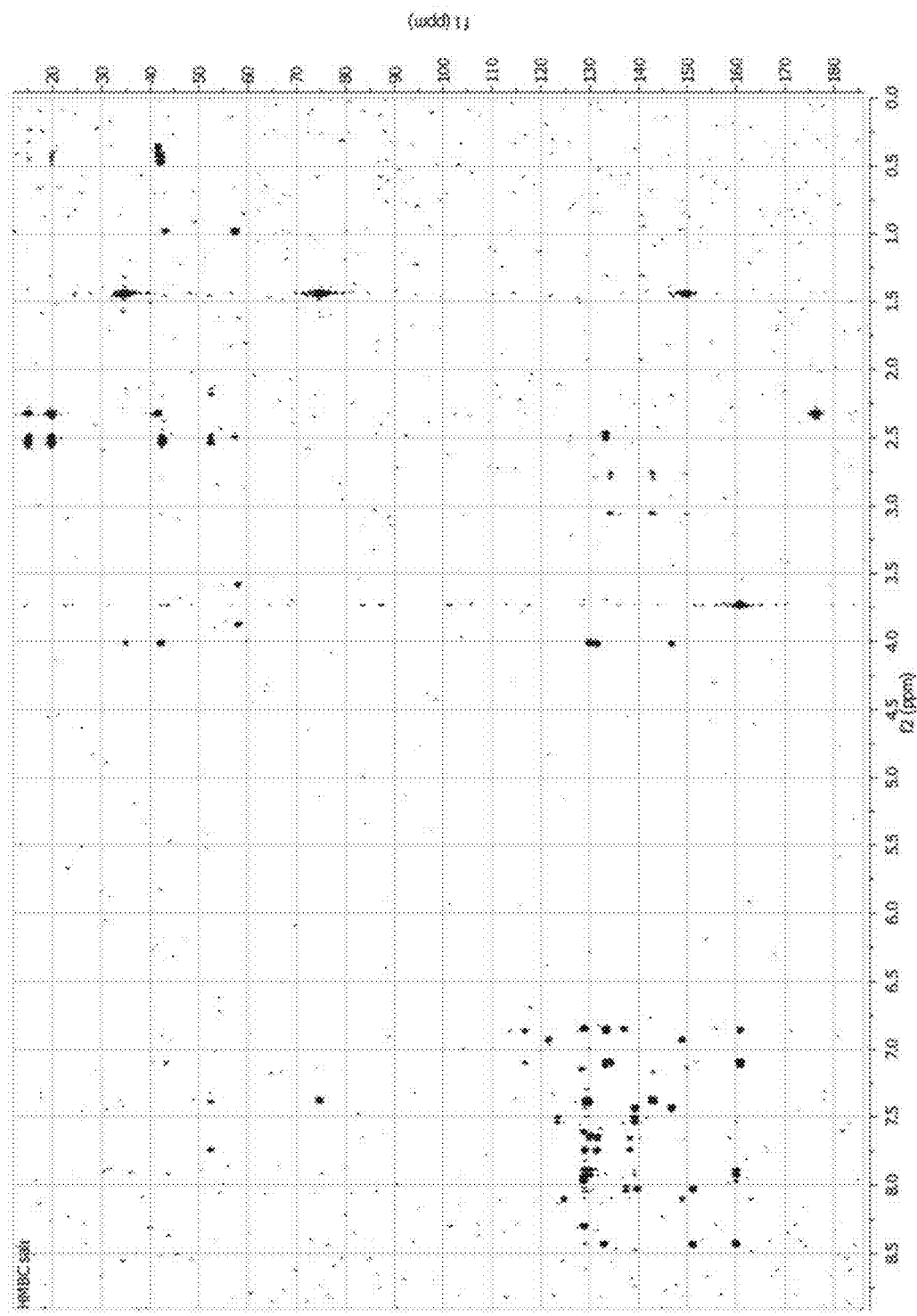
FIG. 6 shows the $^1$H-NMR (700 MHz; DMSO-d6) comparison spectra of Montelukast formoterol salt (underlined date), Montelukast and Formoterol (not underlined data).
Figure 7:
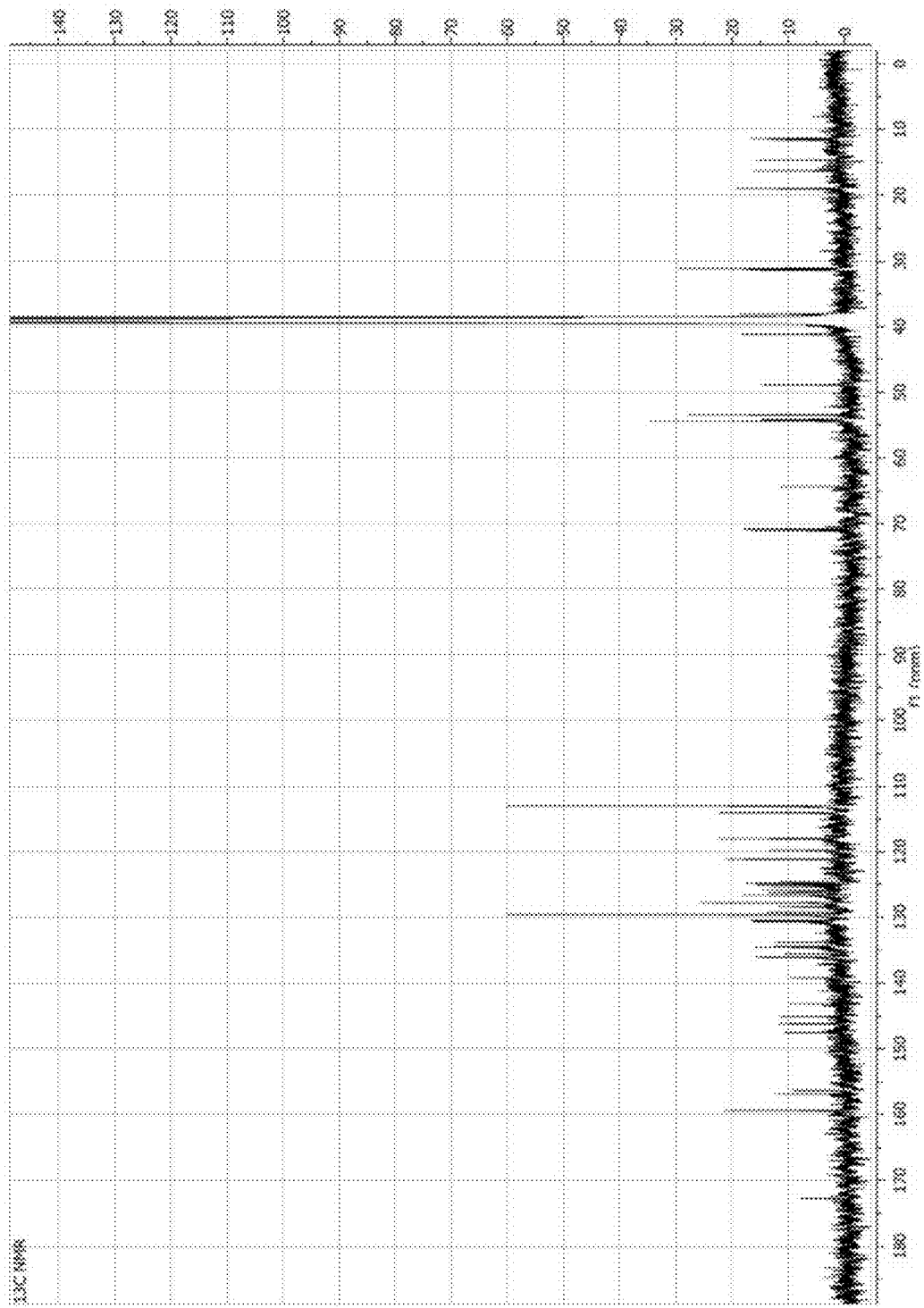
FIG. 7 shows the $^{13}$C-NMR (175 MHz; DMSO-$d_6$) spectrum of Montelukast formoterol salt.
Figure 8:
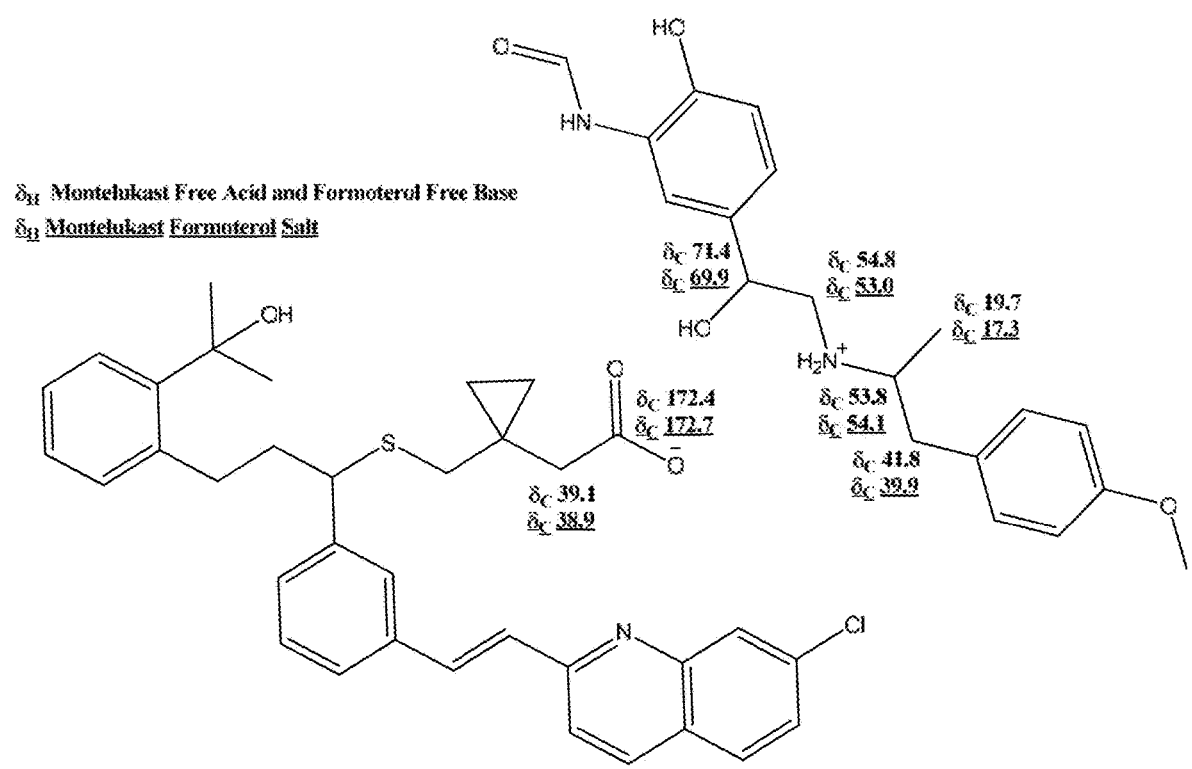
FIG. 8 shows the 3C-NMR (175 MHz; DMSO-$d_6$) comparison spectra of Montelukast formoterol salt (underlined data), Montelukast and Formoterol (not underlined data).

$^{13}$C NMR analysis, carried out by both mono and two-dimensional experiments (FIGS. 6 and 7, respectively), highlighted the variation of the chemical shifts when indissociated forms and the salt were compared (FIG. 8).

NMR variations demonstrated that the carboxylic function is involved in an interaction with the amine function of the Formoterol. Moreover, stoichiometry (in a 1:1 ratio) of the obtained salt was defined comparing $^1$H NMR spectrum signals of the two salt's components.

Figure 9:
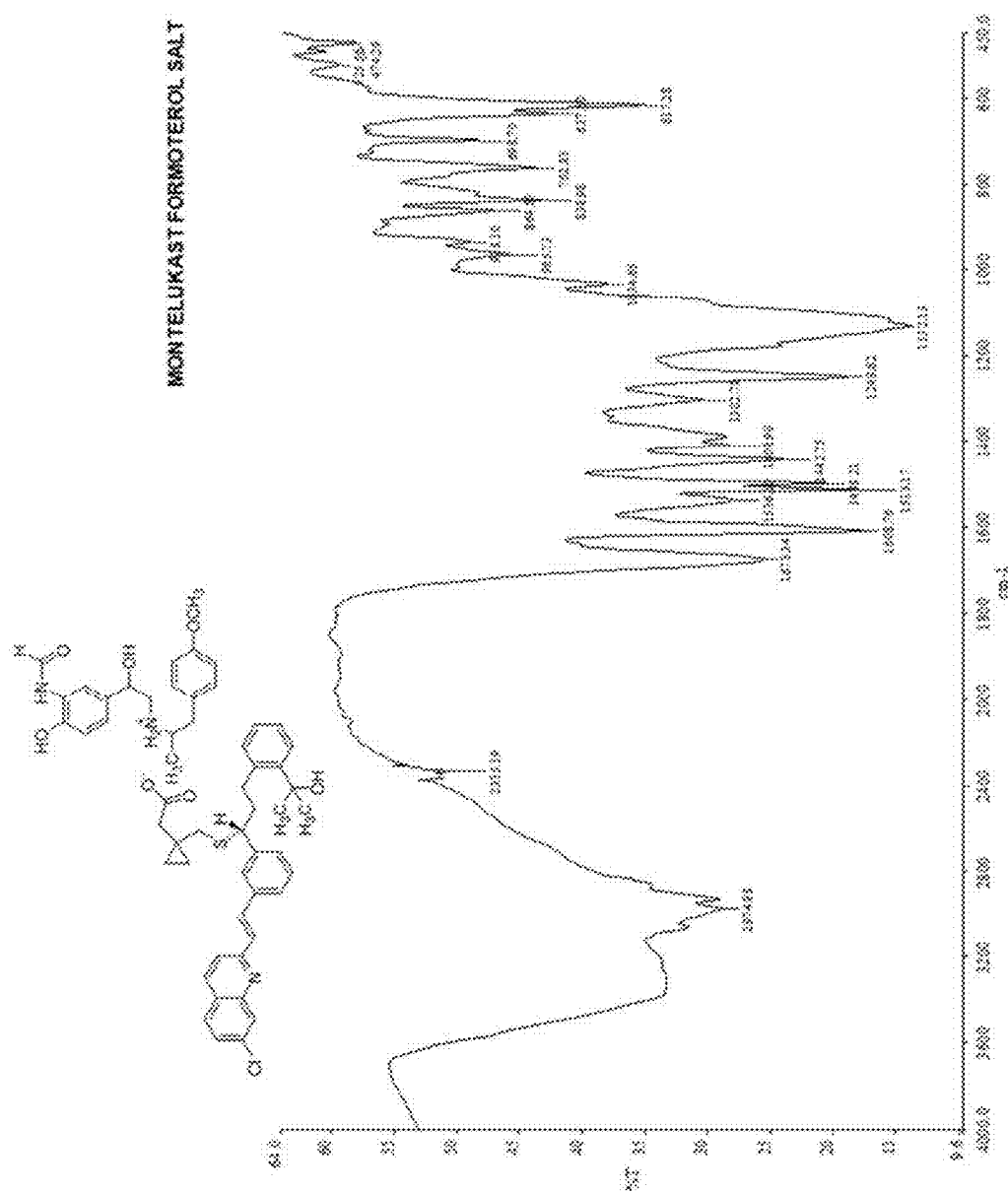
FIG. 9 shows the FT-IR spectrum of Montelukast formoterol salt.
Figure 10:
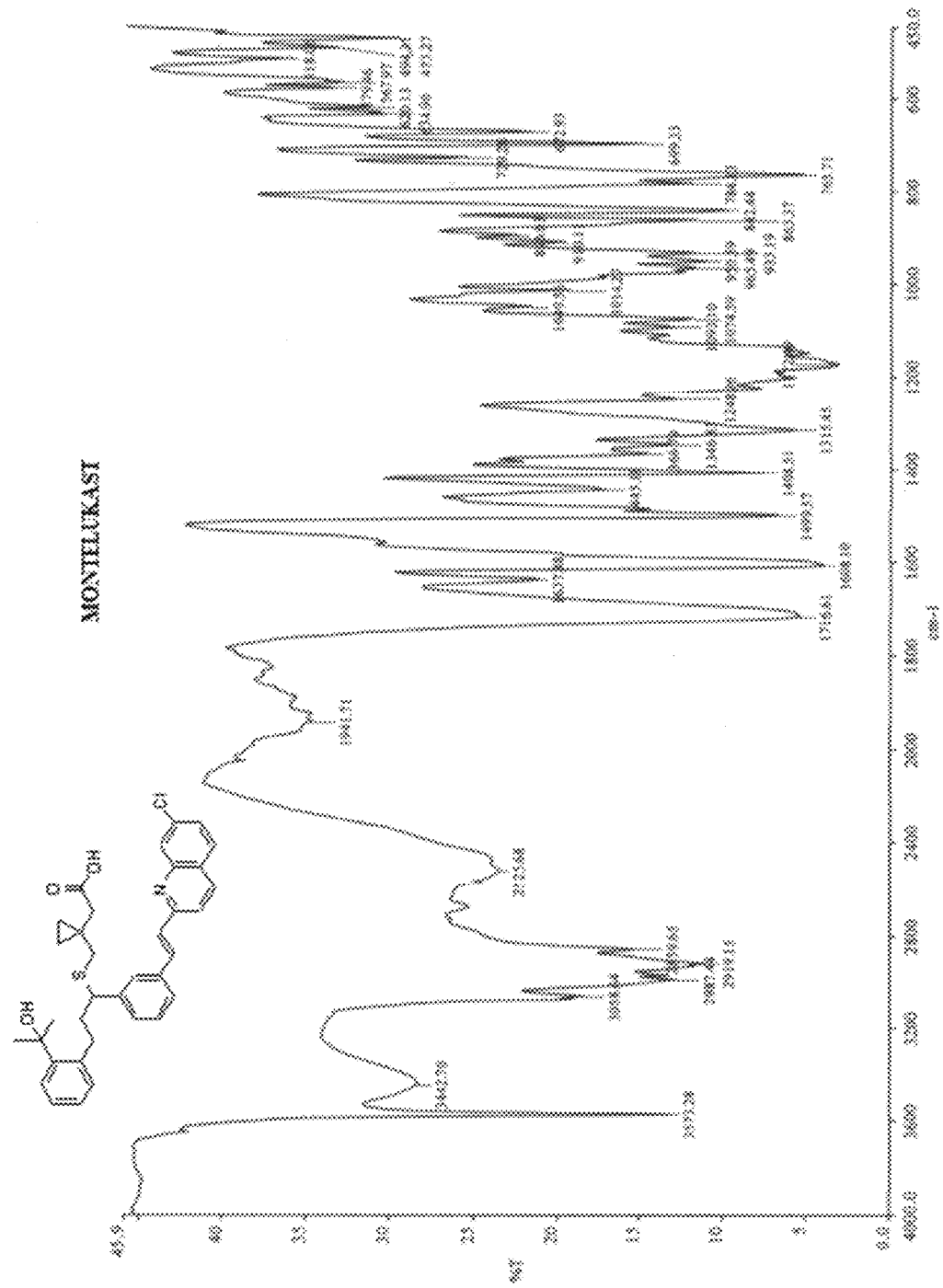
FIG. 10 shows the FT-IR spectrum of Montelukast.
Figure 11:
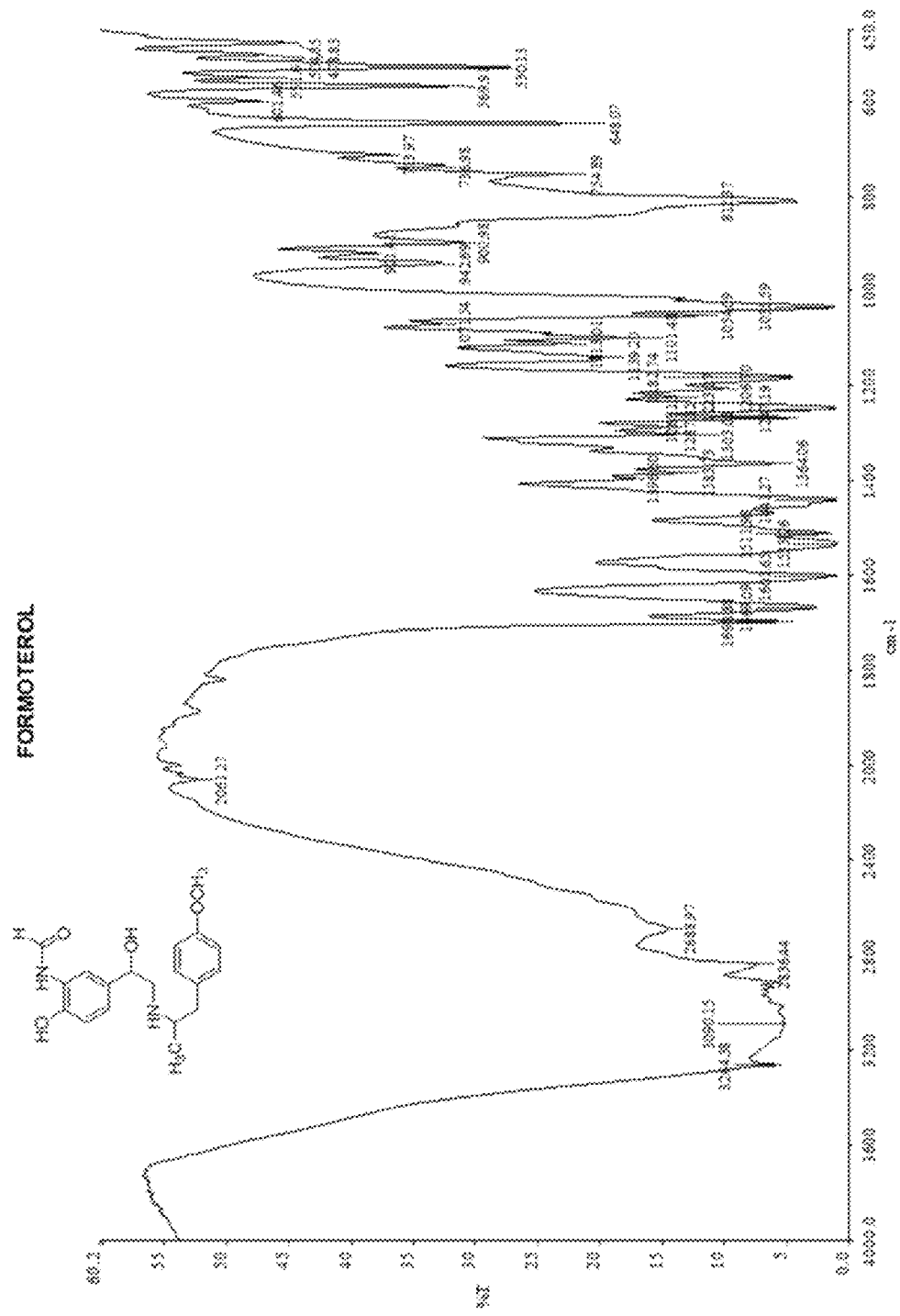
FIG. 11 shows the FT-IR spectrum of Formoterol.

The analysis of the infrared spectrum of Montelukast formoterol salt (FIG. 9) shows some different absorptions compared to the vibrations present in the IR spectra of Montelukast (FIG. 10) and of Formoterol (FIG. 11). In particular, in the IR spectrum of the salt (FIG. 9) the C=O stretching band of acid function present in FIG. 10 (1712 cm$^{-1}$) is absent whereas a asymmetrical stretching band at 1608 cm$^{-1}$, attributable to the carboxylate ion, is shown. In addition, a medium band at 2335 cm$^{-1}$ attributable to the salt of the secondary amine is present (FIG. 9).

The Synergistic Therapeutic Effect of the Montelukast Formoterol Salt Compared to Individual Drugs Our results highlight the therapeutic advantages of this association, which on the one hand optimizes the bronchial relaxing effect of Formoterol and on the other potentiates the anti-inflammatory effect of Montelukast.

Figure 12:
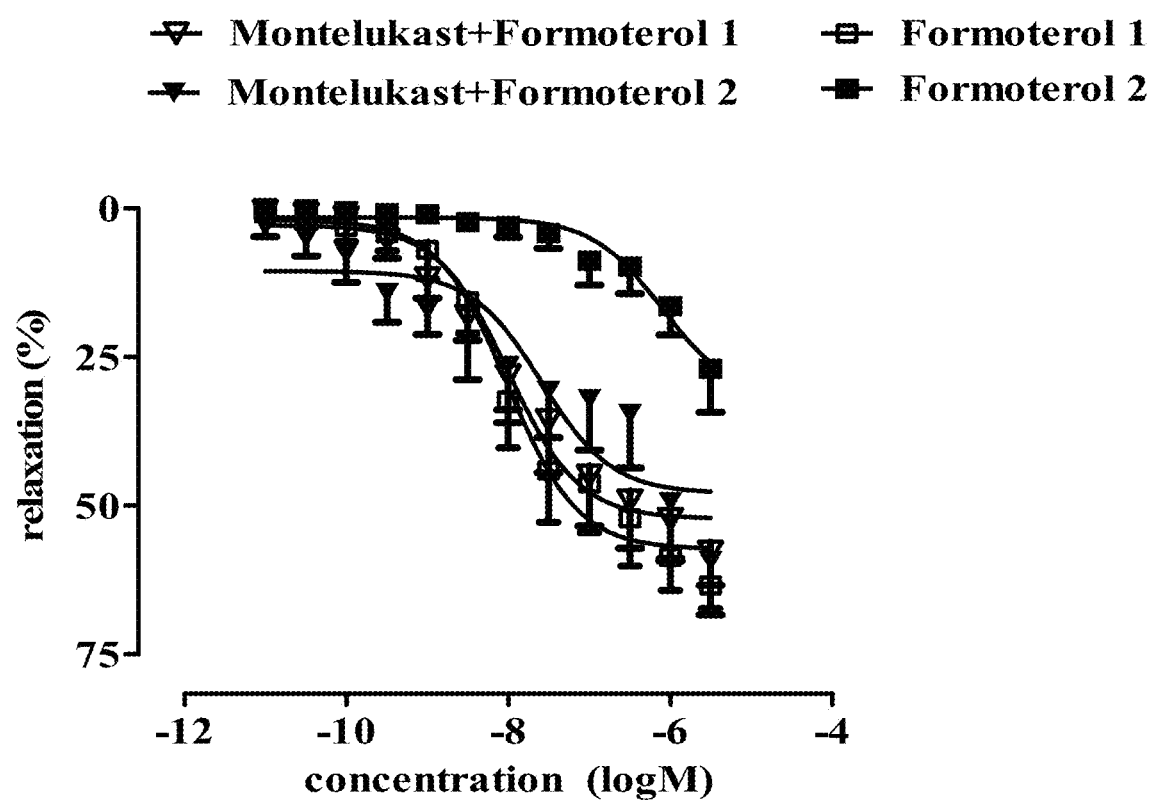
FIG. 12 shows the effect of Formoterol 2 vs Formoterol 1 $p<0.001$.

The exposure of bronchi, precontracted with a muscarinic agonist (carbachol), induces a significant contraction that is effectively reversed by the administration of Formoterol. In fact, the administration of Formoterol promotes a significant bronchial relaxation in a concentration dependent manner (Formoterol 1). This effect, however, is significantly reduced to a subsequent exposure of the bronchial preparation to the adrenergic agonist (Formoterol 2), which is clearly due to the desensitization of the receptor. Conversely, the preincubation of Montelukast in vitro, although it does not alter the bronchodilating response of the Formoterol, preserves its efficacy (FIG. 12). Similar beneficial effects in terms of synergy have been observed in vivo.

Figure 13:
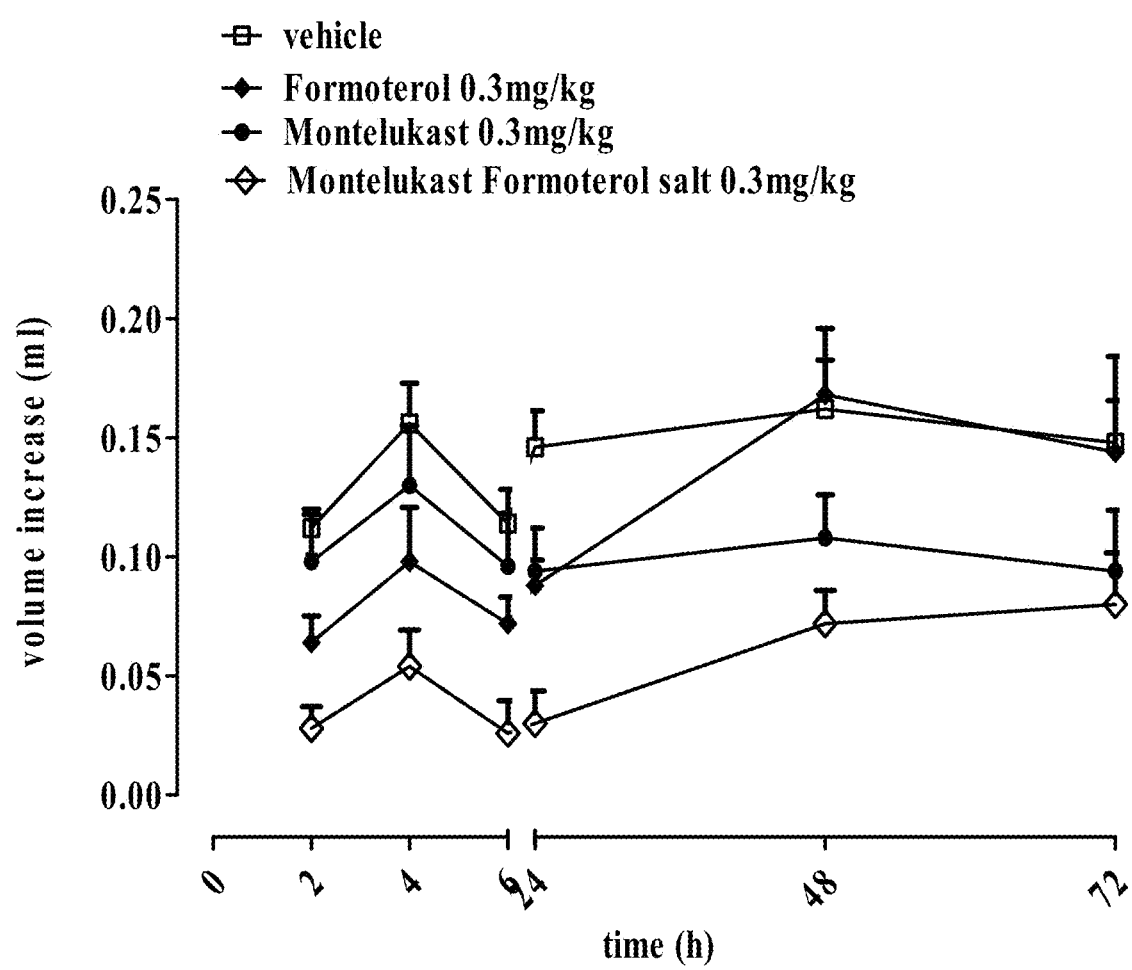
FIG. 13 shows the anti-inflammatory effect of Montelukast Formoterol salt vs vehicle (***$p<0.001$).

Furthermore, the pharmacological treatment of mice with Montelukast (0.3 mg/kg) and Formoterol (0.3 mg/kg) induces an anti-inflammatory effect that is significantly increased by the administration of the Montelukast formoterol salt (0.3 mg/kg) (FIG. 13). It should be stressed that the dose of 0.3 mg/Kg of the salt corresponds, in terms of moles, to a dose five times lower than the two individual drugs.

Based on this data the therapeutic efficacy of the Montelukast formoterol salt was evaluated compared to individual drugs in a mouse model of asthma.

Figure 14:
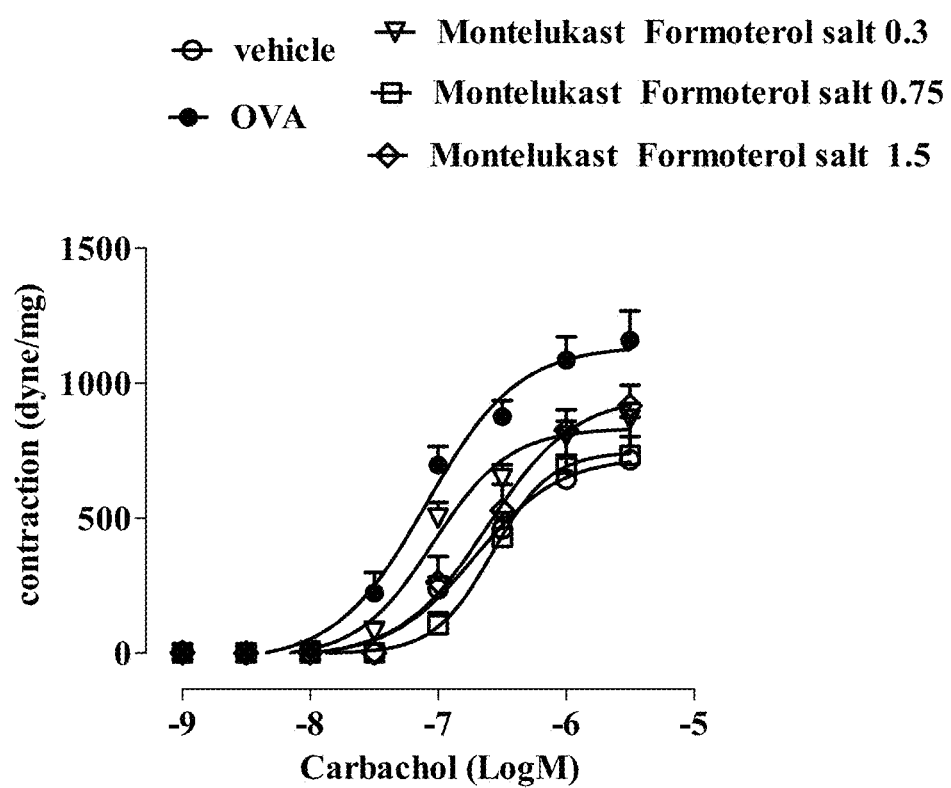
FIG. 14 shows the therapeutic efficacy in preventing bronchial hyperreactivity of Montelukast formoterol salt (0.3, 0.75 and 1.5 mg/Kg) vs OVA $p<0.001$; Montelukast formoterol salt 0.75 mg/Kg vs 0.3 mg/Kg $p<0.001$; Montelukast formoterol salt 0.75 mg/Kg vs 1.5 mg/Kg $p<0.05$.
Figure 15:
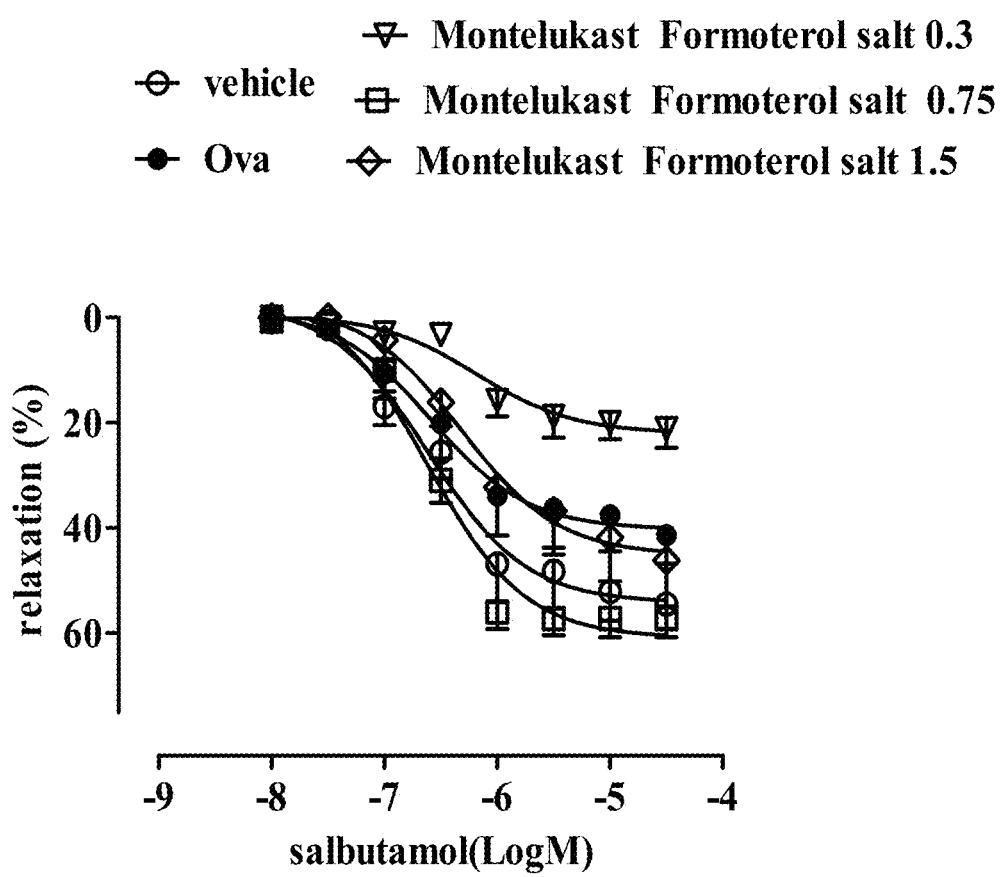

OVA sensitization induces at the bronchial level an increase in the response to carbachol and a reduced response to salbutamol (FIGS. 14 and 15). Pharmacological treatment with the Montelukast formoterol salt results in a good control of bronchial hyperreactivity, which is a dose-related effect (FIG. 14). The best dose of the salt was 0.75 mg/Kg, which reports the bronchial reactivity to basal values, demonstrating a relevant efficacy in preventing hyperreactivity development. This dose is also the most effective in controlling the response to salbutamol (FIG. 15). Furthermore, sensitization determines an inflammatory condition that causes a significant reduction in the response to beta-adrenergic agonists, which today represent the most effective drugs in the control of hyperreactivity. The dose of 0.75 mg/Kg not only abrogated the increased response to carbachol, but preserved the lack of efficacy of salbutamol in inducing bronchial relaxation.

In another series of experiments we compared the therapeutic efficacy of the Montelukast formoterol salt at the dose of 0.75 mg/kg to the administration of the individual drugs Formoterol (0.3 mg/kg) and Montelukast (0.3 mg/kg).

Figure 16:
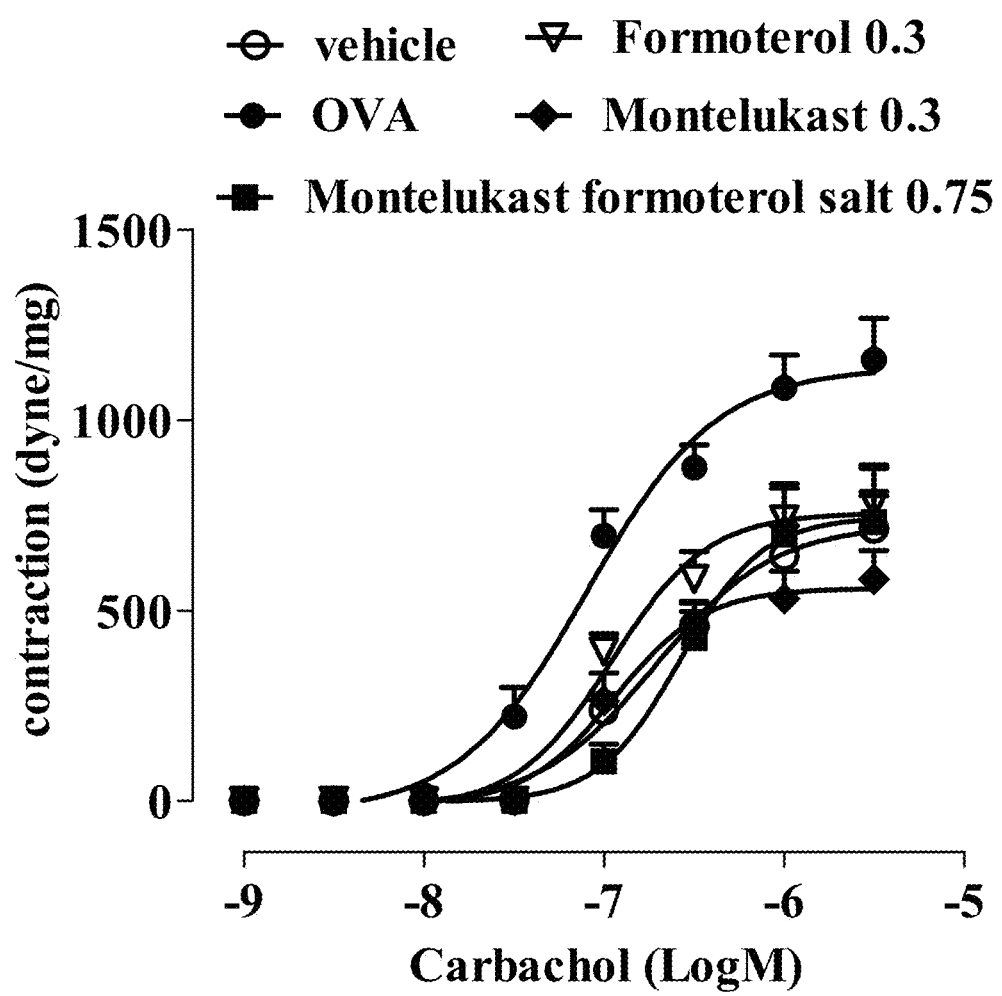
FIG. 16 shows the therapeutic efficacy in preserving salbutamol-induced bronchial relaxation of Montelukast formoterol salt 0.75 mg/Kg vs OVA $p<0.001$.
Figure 17:
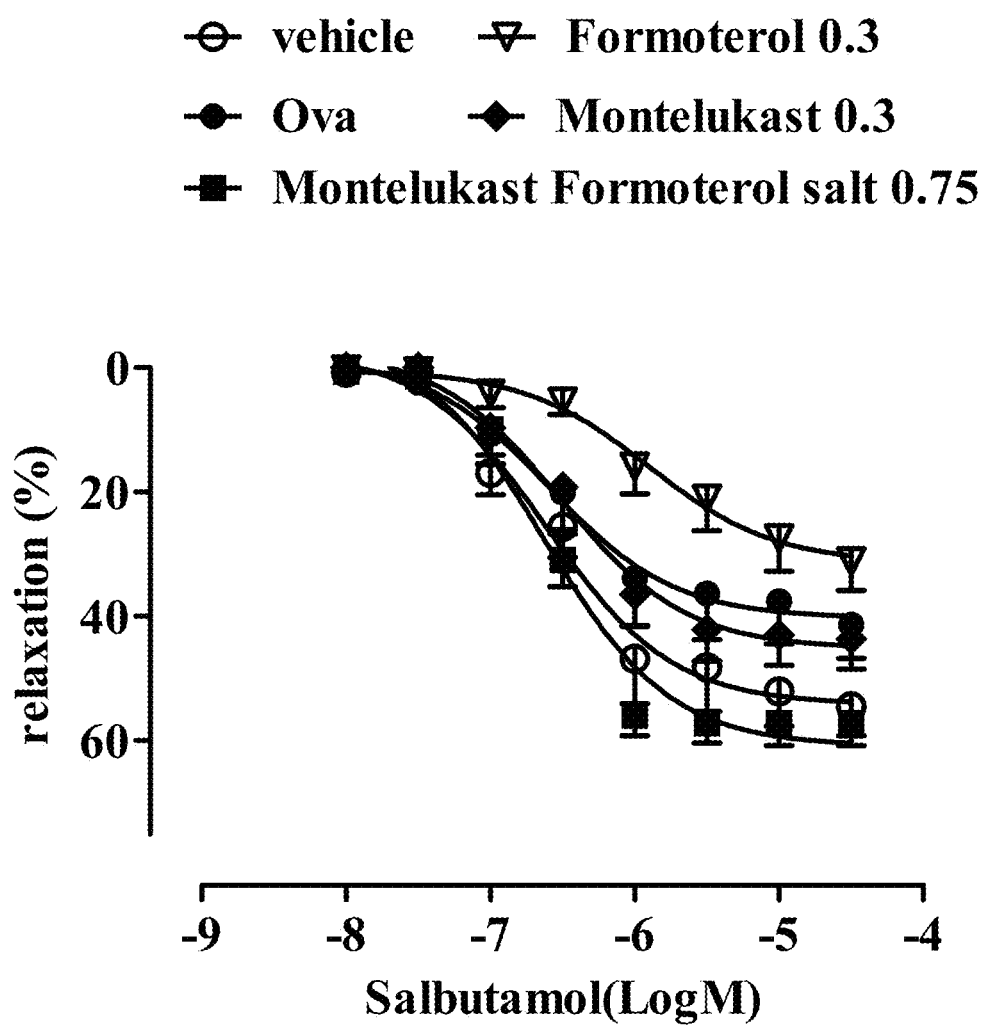
FIG. 17 shows the therapeutic efficacy in preserving salbutamol-induced bronchial relaxation of Montelukast formoterol salt. Montelukast formoterol salt vs OVA $p<0.001$; Montelukast formoterol salt vs Formoterol $p<0.001$; Montelukast formoterol salt vs Montelukast $p<0.001$.

The results obtained confirmed the superiority of the Montelukast formoterol salt in preserving the bronchial function. Montelukast formoterol salt was administered in terms of moles at a halved concentration compared to individual drugs (FIGS. 16 and 17). The results obtained show a therapeutic efficacy of the Montelukast formoterol salt significantly higher than the parent drugs Formoterol and Montelukast (administered at an almost double molar dose) in controlling the development of hyperreactivity to carbachol induced by sensitization (FIG. 16). In addition Montelukast formoterol salt demonstrated a significant efficacy in preserving the efficacy of salbutamol in modulating bronchial relaxation. Indeed, as evident from the graph (FIG. 17), Ovalbumin challenge induces a significant reduction of salbutamol-induced relaxation. Only Montelukast formoterol salt treatment efficiently reverses this effect.

Figure 18:
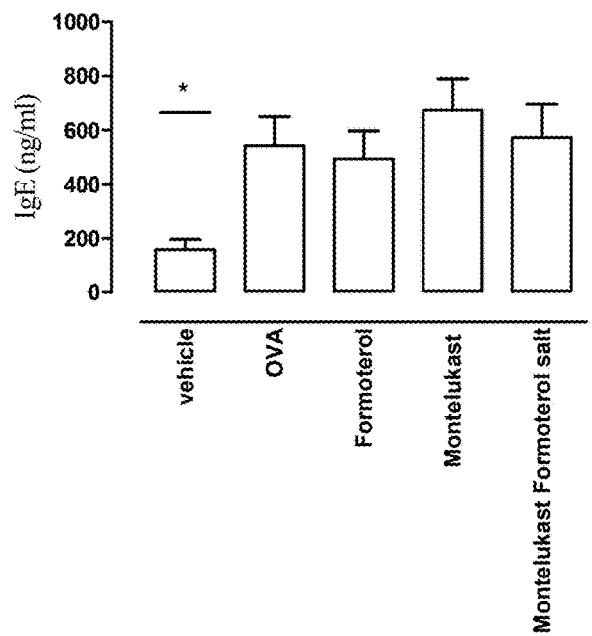
FIG. 18 shows the therapeutic efficacy in preventing bronchial hyperreactivity of Montelukast formoterol salt. Formoterol, Montelukast and Montelukast formoterol salt vs OVA $p<0.001$; Montelukast formoterol salt vs Formoterol $p<0.05$.
Figure 18:
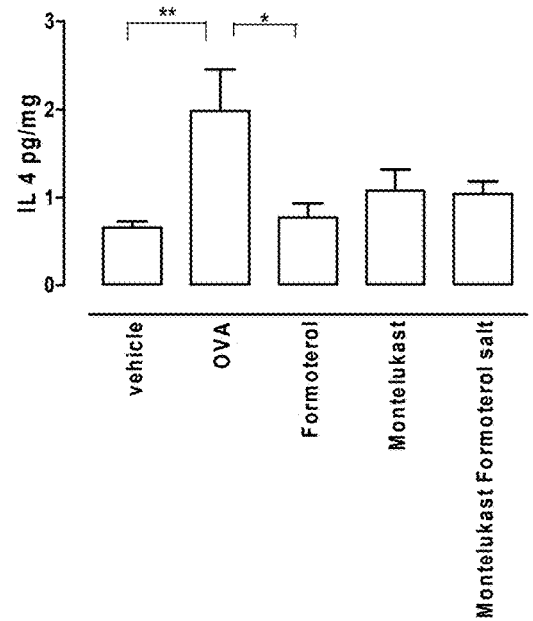
Figure 18:
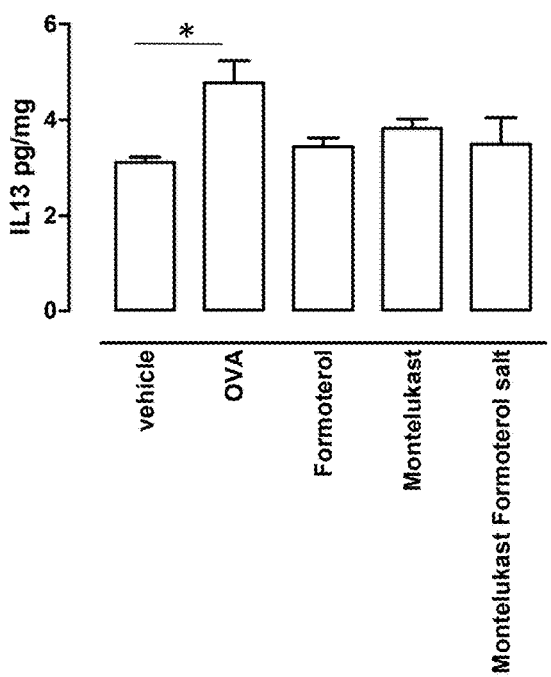

Biochemical studies were performed on plasma and lung tissues harvested from mice sensitized and treated with Montelukast formoterol salt (0.75/mg/Kg). Formoterol (0.3 mg/Kg) and Montelukast (0.3 mg/Kg) (FIG. 18). IgE plasma levels (FIG. 18-A) demonstrate that none of the tested drugs, as expected, alters the efficacy of sensitization since IgE levels are unaffected by all treatments. On the other hand Montelukast formoterol salt, although administered at halved dose respect to the single drugs, shows a similar efficacy in inhibition of both IL-4 (FIG. 18-B) and IL-13 (FIG. 18-C) cytokines, that play a key role in cellular mechanisms underlying asthma like features such as airway hyper-reactivity and inflammation.

Experiments conducted in vivo, using a mouse model of asthma, even more reinforce our hypothesis. The results obtained confirm a therapeutic efficacy of the Montelukast formoterol salt significantly higher than Formoterol and Montelukast (administered at double molar dose) in controlling the airway dysfunction induced by sensitization.

Montelukast formoterol salt demonstrated a significant efficacy both in the control of bronchial hyperreactivity and in preserving the efficacy of salbutamol in modulating bronchial relaxation. Indeed Ovalbumin challenge induces both airway hyperreactivity and a significant reduction of salbutamol-induced relaxation. The treatment with Montelukast formoterol salt (at halved dose respect to single drugs) more efficiently reverses both airway effects, when compared with the single grugs.

In conclusion the data obtained so far suggest three values added to the Montelukast formoterol salt: 1) marked reduction of the phenomenon of $\beta_2$ receptor desensitization; 2) an increased efficacy in the control of allergen-induced airway dysfunction; 3) an increased anti-inflammatory activity.

The invention claimed is:

1. A salt formed between Montelukast and a ß2 adrenergic agonist, wherein the ß2 adrenergic agonist is, selected from the group consisting of Fenoterol, Orciprenaline, Salbutamol, Terbutaline, Bambuterol, Clenbuterol, Formoterol, Salmeterol, Vilanterol, Indacaterol and Olodaterol.

2. The salt according to claim 1, wherein the β2 adrenergic agonist is selected from the group consisting of Formoterol, Fenoterol, Salmeterol, Vilanterol and Salbutamol.

3. The salt according to claim 2, which is a crystalline form I of Formoterol salt of Montelukast salt by a X-ray powder diffraction spectrum, which is obtained by using CuKα radiation and represented by °2θ angle, in which there are characteristic peaks at about 6.39, 9.97, 13.05, 13.77, 15.42, 16.87, 17.87, 18.25, 20.37, 20.77, 23.14, 24.57, 26.23, 28.01, 28.96, 32.09, 33.81 and 38.57.

4. The salt according to claim 2, which is a crystalline form I of Formoterol salt of Montelukast salt characterized by a X-ray powder diffraction spectrum as represented in FIG. 1.

5. A pharmaceutical composition comprising the salt according to claim 1, in combination with at least one physiologically acceptable excipient.

6. The pharmaceutical composition according to claim 5, wherein said composition is in the form of powder, suspension or solution.

7. The pharmaceutical composition according to claim 6, which is packaged for administration by inhalation or oral route.

8. A method for treating respiratory inflammatory pathologies, obstructive pathologies, and allergen-induced airway dysfunctions, in a subject in need thereof, comprising administration of an effective amount of the salt according to claim 1, alone or in combination with one or more physiologically acceptable excipients.

\* \* \* \* \*